United States Patent [19]
Miyazawa et al.

[11] Patent Number: 5,247,220
[45] Date of Patent: Sep. 21, 1993

[54] ULTRASONIC MOTOR

[75] Inventors: Osamu Miyazawa; Kiyoto Takedo, both of Suwa, Japan

[73] Assignee: Seiko Epson Corporation, Tokyo, Japan

[21] Appl. No.: 602,444

[22] Filed: Oct. 22, 1990

[30] Foreign Application Priority Data

| Oct. 20, 1989 | [JP] | Japan | 1-273082 |
| Jan. 16, 1990 | [JP] | Japan | 2-2503[U] |
| Jan. 16, 1990 | [JP] | Japan | 2-2504[U] |
| Feb. 15, 1990 | [JP] | Japan | 2-14036[U] |
| Feb. 19, 1990 | [JP] | Japan | 2-15314[U] |
| Mar. 6, 1990 | [JP] | Japan | 2-54031 |
| Jun. 8, 1990 | [JP] | Japan | 2-150165 |
| Jun. 22, 1990 | [JP] | Japan | 2-66299[U] |
| Jul. 6, 1990 | [JP] | Japan | 2-178714 |

[51] Int. Cl.$^5$ .............................................. H01L 41/08
[52] U.S. Cl. .................................. 310/323; 310/364; 310/316; 310/317
[58] Field of Search ............... 310/316, 317, 323, 328, 310/364

[56] References Cited

U.S. PATENT DOCUMENTS

| 4,513,219 | 4/1985 | Katsuma et al. | 310/364 X |
| 4,692,672 | 9/1987 | Okuno | 310/323 |
| 4,727,276 | 3/1988 | Izukawa et al. | 310/323 |
| 4,739,212 | 4/1988 | Imasaka et al. | 310/323 |
| 4,763,148 | 8/1988 | Tsukimoto et al. | 310/323 |
| 4,771,203 | 9/1988 | Mukohjima et al. | 310/323 |
| 4,794,294 | 12/1988 | Shimizu | 310/323 |
| 4,829,209 | 5/1989 | Kawasaki et al. | 310/323 |
| 4,882,500 | 11/1989 | Iijima | 310/323 |
| 4,914,336 | 4/1990 | Yamasaki | 310/323 |
| 4,937,488 | 6/1990 | Fujie et al. | 310/323 |
| 4,952,834 | 8/1990 | Okada | 310/323 |
| 4,954,742 | 9/1990 | Izukawa | 310/323 |
| 4,980,599 | 12/1990 | Kuwabara et al. | 310/323 |
| 5,001,404 | 3/1991 | Rataoka | 310/323 |
| 5,006,746 | 4/1991 | Kasuga et al. | 310/323 |
| 5,010,222 | 6/1990 | Suganuma | 310/323 |
| 5,013,956 | 5/1991 | Kurozumi et al. | 310/323 |
| 5,023,526 | 10/1989 | Kuwabara et al. | 310/323 |
| 5,087,852 | 3/1990 | Culp | 310/323 |

FOREIGN PATENT DOCUMENTS

| 58-93477 | 6/1983 | Japan . | |
| 59-122385 | 7/1984 | Japan . | |
| 59-37673 | 9/1984 | Japan . | |
| 60-51478 | 3/1985 | Japan . | |
| 245482 | 5/1985 | Japan . | |
| 0224883 | 10/1986 | Japan | 310/323 |
| 148077 | 6/1987 | Japan . | |
| 0247770 | 10/1987 | Japan | 310/323 |
| 0064582 | 3/1988 | Japan | 310/323 |
| 190569 | 8/1988 | Japan . | |
| 0283475 | 11/1988 | Japan | 310/323 |
| 0305772 | 12/1988 | Japan | 310/323 |
| 1107678 | 4/1989 | Japan | 310/323 |

OTHER PUBLICATIONS

Iijima, et al, Ultrasonic Motor Using Flexural Standing Wave, Japanese Journal of Applied Physics Supplement, vol. 26, No. 26-1, 1987.

Primary Examiner—Mark O. Budd
Attorney, Agent, or Firm—Blum Kaplan

[57] ABSTRACT

An ultrasonic step motor is provided with a stator and rotor. The rotor has a plurality of projections extending in the direction of the stator so that contact is made between the rotor and the stator creating a frictional force to drive the rotor. Vibrators are formed from a piezoelectric material directly attached to the stator. The ultrasonic motor further includes a drive control apparatus for impressing standing waves to the vibrating elements of the vibrator causing a change over to the phase or carrying out an ON-OFF operation of the ultrasonic motor.

42 Claims, 35 Drawing Sheets

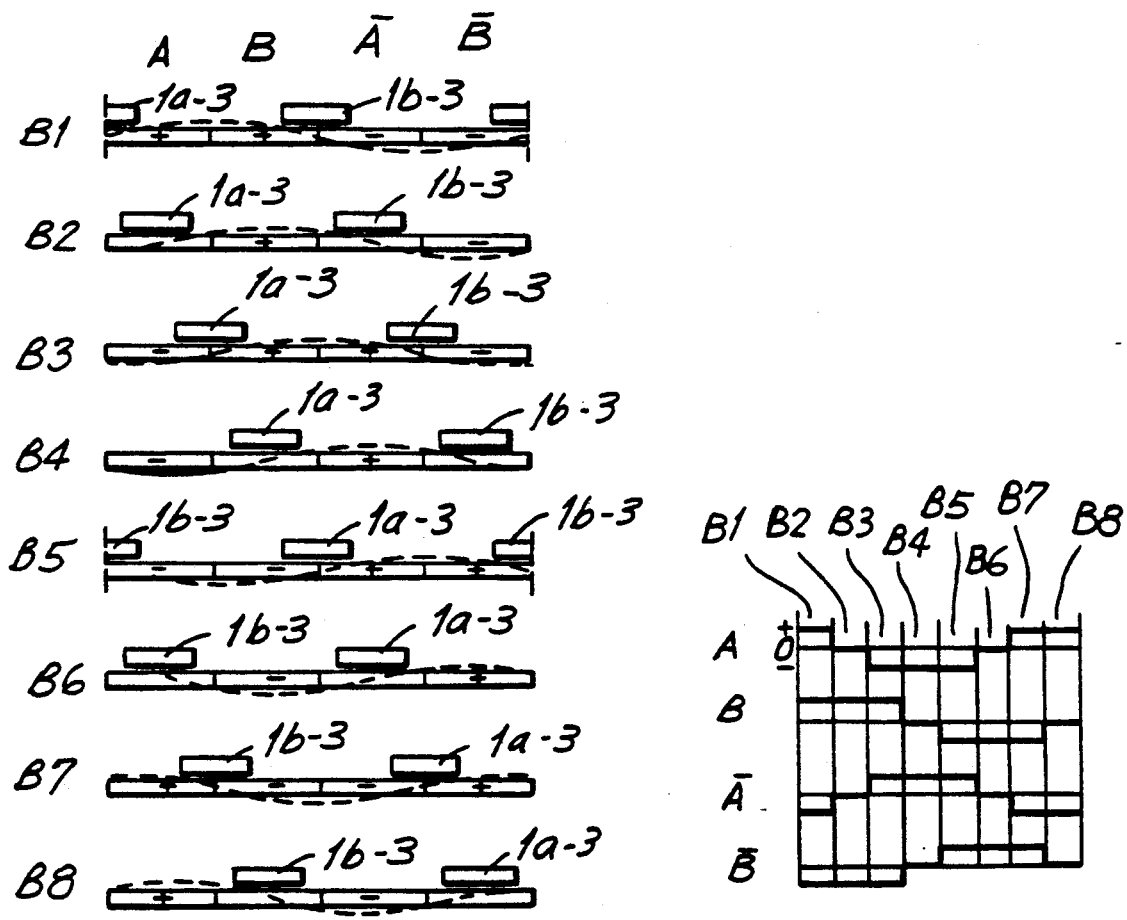
FIG. 14
FIG. 15
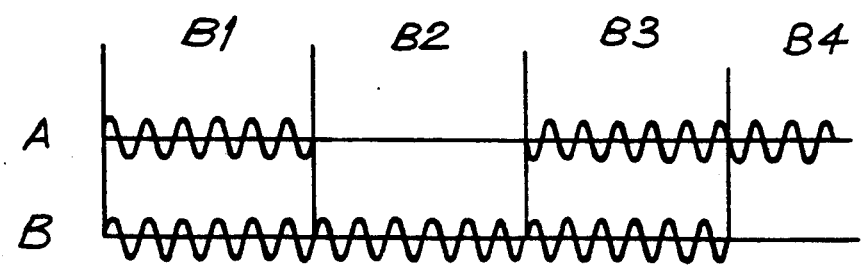
FIG. 16

ULTRASONIC MOTOR

BACKGROUND OF THE INVENTION

The present invention generally relates to an ultrasonic motor, and more particularly, to an ultrasonic motor driven by ultrasonic vibration.

Conventional types of ultrasonic motors using vibration have been proposed as described in, Japanese Patent Laid-Open Nos. 58-93477, 59-122385 and 60-51478 and Japanese Patent Publication 59-37673. The Japanese Patent Laid-Open No. 58-93477 discloses a method for arbitrarily switching the driving direction of a piezoelectric motor as required by applying a voltage output having the prescribed phase difference to a plurality of vibrators. Japanese Patent Laid-Open No. 59-122385 discloses a method for converting strong vibration energy of a supersonic wave into rotational or linear movement. This is accomplished by utilizing traveling waves combined with lateral waves and longitudinal waves excited on the surface of an elastic material. Japanese Laid-Open No. 60-51478 discloses a motor which displays accurate time by etching a pattern of 60 divisions of an electronic timepiece made of a piezoelectric motor. In this manner, the pattern detects the rotating state to control the drive of the motor.

The above ultrasonic motors have been satisfactory. However, the embodiments set forth above continuously rotate or rotate only when the driving voltage poorly formed driving wave shapes are input to the motor. Therefore, it is necessary to use a feedback control system of the conventional ultrasonic motor to control the RPM, stop positions and rotational speed. Hence, the system requires a control circuit resulting in the complication of the entire control system of the ultrasonic motor.

Accordingly, it is desirable to provide an ultrasonic motor which overcomes the shortcomings of the prior art.

SUMMARY OF THE INVENTION

Generally speaking, in accordance with the invention, an ultrasonic step motor is provided. The ultrasonic motor includes a stator and a rotor. The rotor has a plurality of projections which contact the stator creating a fictional force to drive the rotor. Vibrators are formed from a piezoelectric material directly attached to the stator. The ultrasonic motor further includes a drive control circuit for outputting standing waves to the vibrating elements of the vibrator. A phase change is caused in the standing wave or the vibrating elements are selectively turned on and off to step drive the rotor.

Accordingly, it is an object of the invention to provide an improved ultrasonic motor.

Yet another object of the invention is to provide an ultrasonic motor which enables easy selection between a continuous drive on an advancing wave or a stepwise drive on a standing wave to drive the motor.

Another object of the present invention is to provide an ultrasonic motor having a stator and a rotor which is stabilized by the frictional force caused therebetween.

A further object of the invention is to provide an ultrasonic motor wherein the rotating speed, torque and efficiency are improved.

Still another object of the invention is to provide an ultrasonic motor which is stably driven by forming relief portions on the projections of the stator or the rotor.

Another object of the invention is to provide an ultrasonic motor having enlarged oscillation displacement by forming projections about the circumference of the stator, thereby decreasing the machining cost.

Yet, a further object of the invention is to provide an ultrasonic motor which is easily manufactured.

Yet, still another object of the present invention is to provide an ultrasonic motor having a rotor with slit portions being formed thereon by an etching process.

Another object of the invention is to provide an ultrasonic motor having a stator which is directly formed with a piezoelectric material.

A further object of the invention is to provide an ultrasonic motor with a plurality of projections formed thereon at set intervals so as to come in contact with the stator to create a stepwise driven motor.

Another object of the invention is to provide an ultrasonic motor having a drive control apparatus for inputting standing waves to a plurality of vibrating devices of the vibrator, thereby switching the individual phases or carrying out the ON-OFF operation wherein the changing of phases enables the ultrasonic motor to be stepwise driven allowing the ultrasonic motor to determine the position of the rotor by a sequential control process without feedback control.

Yet a further object of the invention is to provide an ultrasonic motor having N number of node diameters and the position of the node of the rounded stator oscillate in a vibration mode of a standing wave shifted by 8 degrees at a time so that the rotor rotates $\theta$ degrees at a time wherein $\theta$ is set such that $\theta° < 90°/N$ in a direction of the rotor.

Yet still another object of the invention is to provide an ultrasonic motor having a drive control apparatus set to make the vibrator induce a vibration mode having a standing wave of one wave length $\lambda$, wherein $\lambda$ defines one wave length in a vibrating condition, by shifting a position of the node of vibration mode by l at time so that $l < \lambda/4$ relative to the wave length in a moving direction of the rotor.

Another object of the invention is to provide an ultrasonic motor which allows the selection of either a stepwise drive by a standing wave or a continuous drive by an advancing wave such that when the advancing wave is selected it is possible to obtain a smooth rotation and a high speed feeding of the motor.

A further object of the invention is to provide a rotor of an ultrasonic motor constructed with the flexible material such that a stable contacting condition is obtained without the projections of the stator having heights which are precisely machined resulting in an ultrasonic motor of high efficiency and low cost.

Still another object of the invention is to provide a rotor of an ultrasonic motor with slanted or curved relief portions on the sliding portion of the projections so that the construction is simple and produced at a low cost, thereby decreasing the interference caused between the projections of the rotor and the stator to obtain a stable driving.

Another object of the invention is to provide a stator of an ultrasonic motor with projections formed on the circumference of the stator such that the contact point between the stator and the rotor is placed outside the piezoelectric element thereby enlarging the bending oscillation displacement since the rigidity does not substantially change the deflection deformation.

A further object of the invention is to provide projections of a stator of an ultrasonic motor placed at positions separated and opposed to the vibration nodes such that it is possible to obtain an ultrasonic step motor having a precise stepping angle.

Yet still another object of the invention is to provide an ultrasonic motor having a plurality of electrode patterns on the piezoelectric element and wiring patterns corresponding to the plurality of electrode patterns.

Another object of the invention is to provide a plurality of electrode patterns and wiring patterns of an ultrasonic motor conducted through an anisotropic conductor so that the patterns are easily removable and conductible, thereby forming an integral anisotropic conductor so that contacting conduction with the stator is held without any effect to the vibration mode.

Another object of the invention is to form the stators and rotors of the ultrasonic members formed by etching so they may be formed in any shape and be miniaturized.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 14 is a schematic diagram showing the vibration nodes and the contacting portions of the ultrasonic step motor of FIG. 13;

FIG. 15 is a timing chart of the phase of the drive voltage for the ultrasonic step motor of FIG. 13;

FIG. 16 is a timing chart of the driving voltage applied to the ultrasonic step motor of FIG. 13;

FIG. 27b is a plan view of the stator and the rotor of FIG. 27a;

DESCRIPTION OF THE PREFERRED EMBODIMENTS

Figure 1:
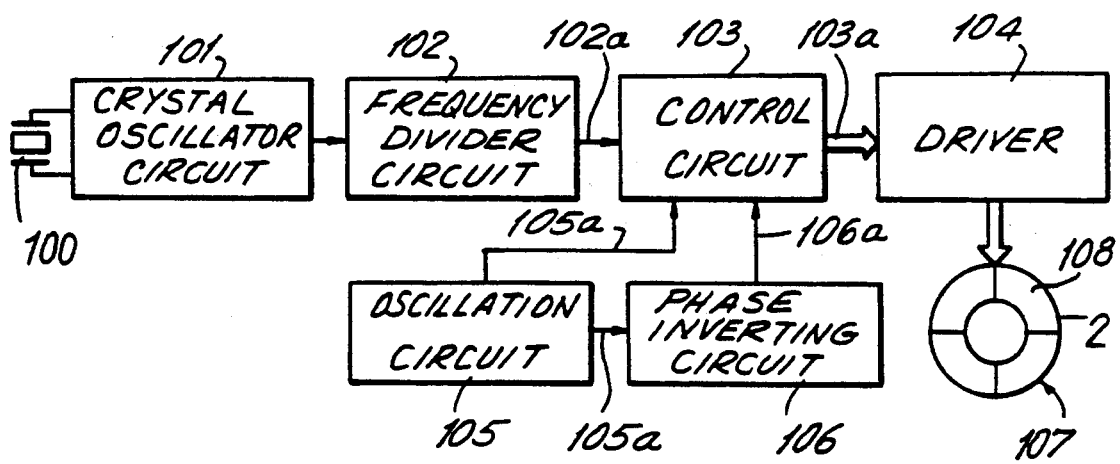
FIG. 1 is a block diagram of a driving circuit for an ultrasonic step motor constructed in accordance with the invention.

Reference is first made to FIG. 1 in which a block diagram of an ultrasonic step motor for use in an electronic watch and a drive system for driving the motor are provided. A crystal plate 100 drives a crystal oscillator circuit 101 producing a signal. A frequency divider circuit 102 divides the frequency of the signal output by crystal oscillator circuit 101 and outputs a divided frequency signal 102a. A control circuit 103 receives and processes an oscillation signal 105a of an oscillation circuit 105 which oscillates at the same frequency as the resonant frequency of a vibrating unit 107, a signal 106a from a phase inverting circuit 106 for inverting the phase of oscillation signal 105a of the oscillation circuit 105, and divided signal 102a and outputs drive control signals 103a. Phase inverting circuit 106 receives oscillation circuit 105a and inverts signal 105a to produce signal 106a. A driver 104 amplifies the drive control signals 103a from control circuit 103 to apply drive voltages to the vibrating unit 107. Vibrating unit 107 includes vibrators 108 (four vibrators are shown here by way of example) constructed so as to be vibrated independently of one another.

Output signal 102a of the frequency divider circuit 102 acts as a control signal for controlling the output of oscillation signal 105a and the oppositely phased signal 106a. The output signals 103a of control circuit 103 act as drive control signals for driving vibrating unit 107.

Figure 7:
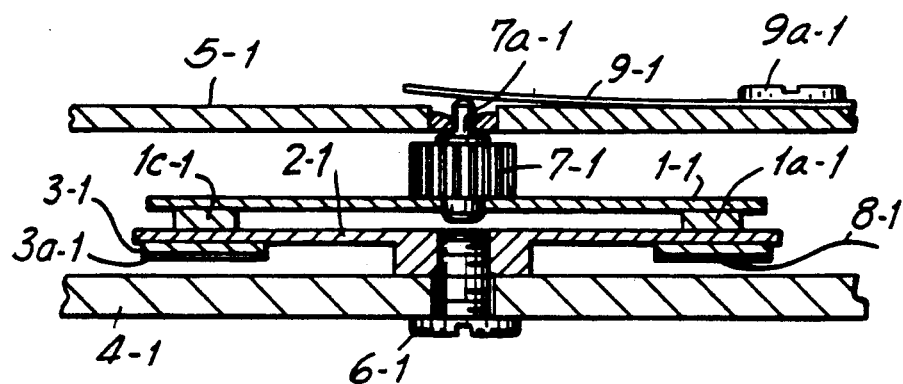
FIG. 7 is a cross-sectional view of an ultrasonic motor constructed in accordance with the invention.
Figure 8:
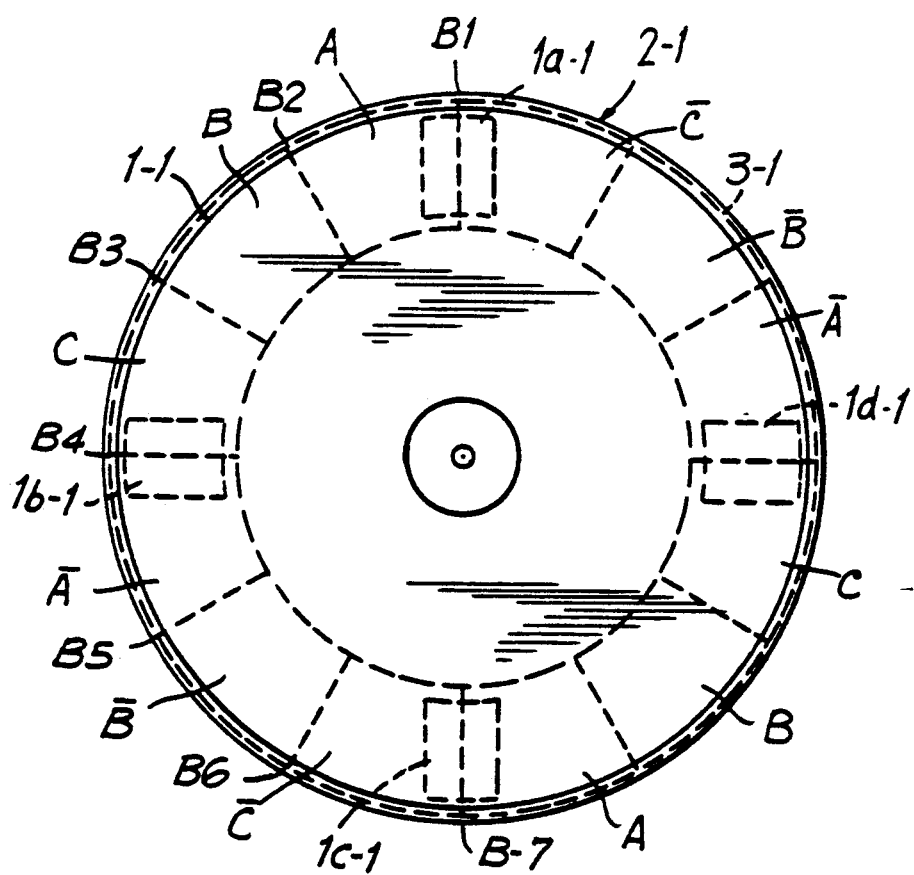
FIG. 8 is a top plan view of the stator and rotor of FIG. 7.

Reference is now made to FIGS. 7 and 8 wherein an ultrasonic step motor constructed in accordance with one embodiment of the invention is provided to explain the principles of the invention. The ultrasonic step motor of FIG. 7 is a rotary type motor. A ground plate 4 supports a stator 2-1. Stator 2-1 is affixed to ground plate 4 with a screw 6. A rotor 1-1 having projections 1a-1, 1b-1, 1c-1 and 1d-1 positioned radially thereabout is disposed on stator 2-1. A pinion 7-1 is press fit within stator 1-1 and is rotatably supported within a wheel train support 5 between jewel bearings 30 by a pivot 7a-1 of pinion 7-1 extending through jewel bearing 30. A spring 9-1 affixed to wheel train support 5-1 by a screw 9a-1 biases pinion 7-1 towards rotor 1-1 imparting a frictional force between projections 1a-1 through 1d-1 of rotor 1-1 and stator 2-1 as well as maintaining pinion 7-1 in place between jewel bearing 30 and rotor 1-1. A piezoelectric unit 3-1 is mounted on stator 2-1 so that stator 2-1 is disposed between rotor 1-1 and piezoelectric unit 3-1. An electrode pattern 3a-1 is formed on piezoelectric unit 3-1 and is coupled to a voltage source such as a battery through lead wires 8-1.

Reference is now made to FIGS. 2a–e in which diagrams are provided for illustrating the operating principle of the ultrasonic step motor in accordance with the invention. In this embodiment, a piezoelectric unit 3-1 is provided as the vibrating unit 107. Each diagram is a linear representation of the rotary ultrasonic step motor of FIGS. 7 and 8.

Figure 2A:
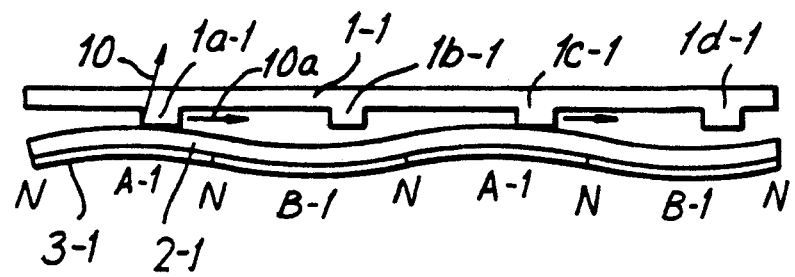
FIGS. 2a-2e are explanatory diagrams for the operation of the ultrasonic step motor.

Reference is first made to FIG. 2a in which the condition of a fixed-phase vibration mode is shown. Rotor 1-1 is formed with projections 1a-1, 1b-1, 1c-1 and 1d-1. Piezoelectric unit 3-1 is attached to stator 2-1 so that stator 2-1 is disposed between rotor 1-1 and piezoelectric unit 3-1. Projections 1a-1 and 1c-1 partially contact with stator 2-1. Piezoelectric unit 3-1 includes four vibrators which are classified into two groups of A and B. Vibrators A and B are displaced in opposite phase to each other. N designates the nodes for the vibration mode of stator 2-1. In this state, projections 1a-1 and 1c-1 partially contact stator 2.

Figure 2B:
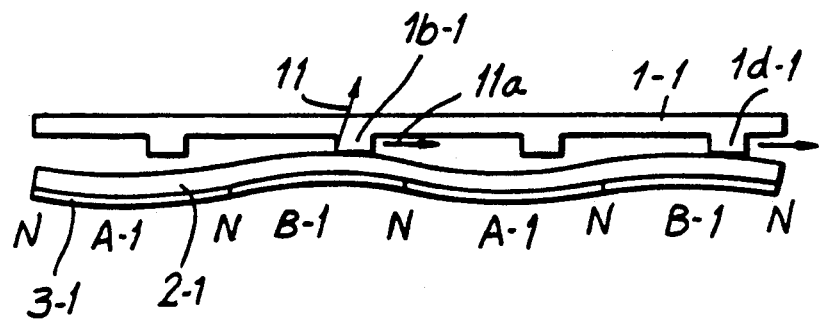

Reference is next made to FIG. 2b in which the condition of the vibration mode of opposite phase to that shown in FIG. 2a is provided In this condition, the projections 1b-1 and 1d-1 partially contact stator 2-1.

In FIGS. 2a and 2b, projections 1a-1, 1b-1, 1c-1 and 1d-1 of rotor 1-1 which are positioned at the same interval or multiple interval of the nodes of the stator 2-1. Projections 1a-1 through 1d-1 are separated from each other by a distance equal to the distance between adjacent nodes or distances which are a multiple thereof to come in contact with stator 2-1. The portions of rotor 1-1 contacting with the stator 2-1, are subject to forces 10 and 11 respectively in the directions shown by the force arrows. Forces 10 and 11 include component forces tending toward the nodes and away from the projections in the vibration modes so that the rotor 1-1 is acted upon by forces in the direction of force components 10a and 11a, respectively, i.e. the forces tending toward the nodes positioned nearby.

Figure 2C:
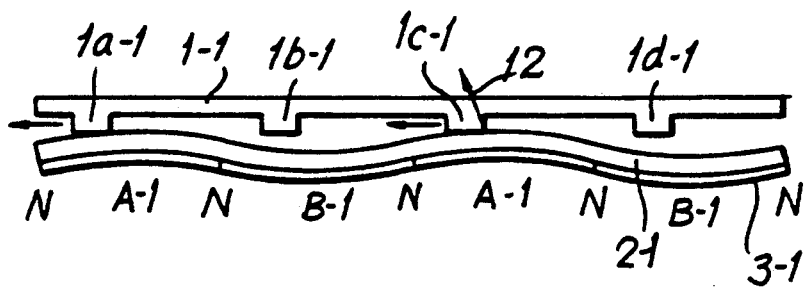
Figure 2D:
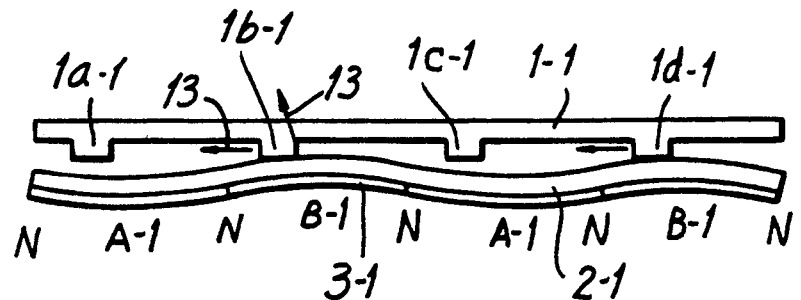

Reference is now made to FIGS. 2c and 2d in which the positional relation of stator 2-1 and the rotor 1-1 is different from FIGS. 2a and 2b, respectively. Rotor 1-1 is subject to forces 12a and 13a having an opposite direction to forces 10a and 11a respectively biasing rotor 1-1 toward the nearest nodes N due to forces 12 and 13, respectively.

Figure 2E:
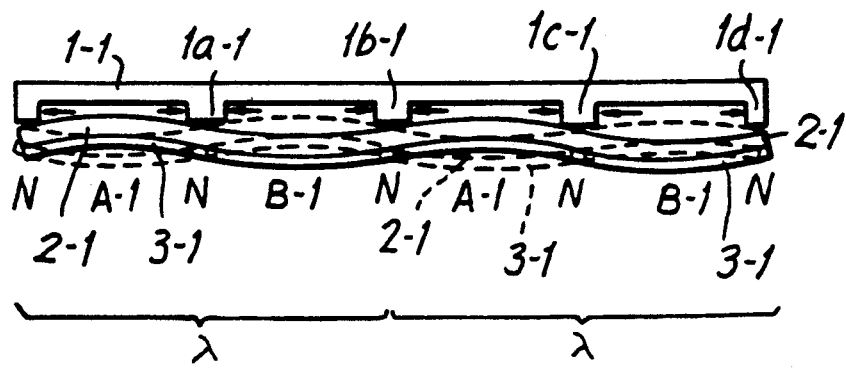

Reference is now made to FIG. 2e in which FIGS. 2a through 2d are superimposed one upon another. It will be seen that in any of these conditions the projections 1a-1 to 1d-1 of rotor 1-1 are shifted in the direction of the nodes N of stator 2-1 and they are positioned at the nodes. As a result, if the positions of the nodes N are moved stepwise, the rotor 1-1 is moved in a stepwise manner thereby operating as a stepping motor as will be described in greater detail below.

Figure 3A:
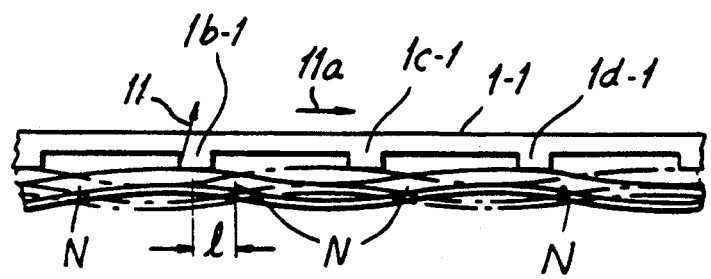
FIG. 3a is a schematic diagram depicting the condition in which the positions of the nodes are shifted in accordance with the invention.

Reference is now made to FIG. 3a, a diagram showing the positions of the nodes N of the stator 2-1 in FIG. 2e as they are each shifted, the amount of shift l of each node N being less than $\lambda/4$ where $\lambda$ defines the length of one wavelength in a vibrating condition. One $\lambda$ is defined as the motion exhibited by a single adjacent vibrator pair A, B. As can be seen projections 1a-1 through 1d-1 are not positioned at the nodes N.

Figure 3B:
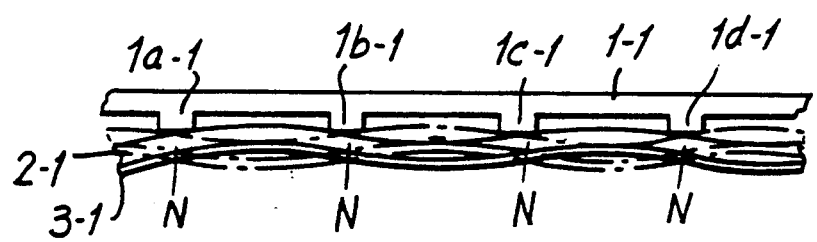
FIG. 3b is a schematic diagram depicting the movement of the rotors in accordance with the invention.

As seen in FIG. 3b, rotor 1-1 is moved from the condition of FIG. 3a. In FIG. 3a, rotor 1-1 is subjected to the force 11 so that the rotor 1-1 is moved in the direction of the force 11a and the projections 1a-1 through 1d-1 are moved to and stopped at the positions of the respective nodes N (FIG. 3b).

Figure 4:
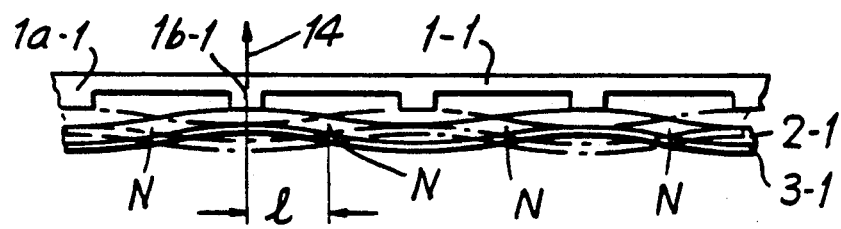
FIG. 4 is a schematic diagram showing the shifting of the node positions by $\lambda/4$.

Reference is now made to FIG. 4, a diagram showing the positions of the nodes N in FIG. 2e each shifted by $l=\lambda/4$. A vertical force 14 acts on the projections 1a-1 and 1c-1 or 1b-1 and 1d-1 of rotor 1-1 so that the rotor 1-1 is not rotated. Rather, rotor 1-1 vertically vibrates in an unstable condition.

Figure 5:
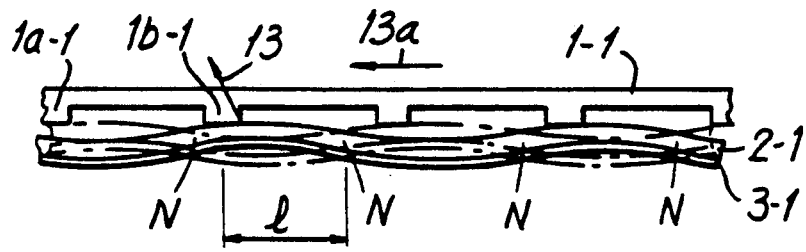
FIG. 5 is a schematic diagram showing the shifting of the node positions by more than $\lambda/4$.

Reference is now made to FIG. 5, a diagram showing the positions of the nodes N in FIG. 2e, each shifted by $l>\lambda/4$. The force 13 acting on the rotor 1-1 now acts in the direction shown and thus the rotor 1-1 is moved in the opposite direction 13a to the direction in which the nodes N are shifted.

As described in detail hereinabove, by setting the amount of shift l of the nodes N to be $l<\lambda/4$, it is possible to stably move the position of the rotor 1-1 to any desired position. It is to be noted that depending on the method of driving the stator, the amount of node shift can be set, for example to $\lambda/2<l<3\lambda/4$. In such a case, however, another node is present at the position of $\lambda/2$ and thus it is substantially equivalent to $0<l<\lambda/4$.

When wavelength $\lambda$ is converted into the angle of circumference with respect to the number of node diameters N, the converted value is $360°/n$. Therefore, the angle $\theta$ is represented as $\theta<90°/n$.

Reference is now made to FIGS. 6a through 6d in which diagrams showing specific methods of shifting the nodes N as discussed above are provided. In each of these Figures the vibrator 107 of FIG. 2 is divided into three parts. Piezoelectric unit 3-1 includes vibrators 21a, 21b, 21c, 22a, 22b, 22c, 23a, 23b, 23c, 24a, 24b, 24c, .... While in reality the piezoelectric unit 3-1 is formed by attaching it to the stator 2-1 as in FIG. 2, here for simplification stator 2-1 is omitted. Also, the invention is not limited to a piezoelectric unit as it is possible to use any other device provided it includes vibrators which are each capable of independently making vibrational displacements. For instance, a super-magnet device or an electromagnetic device can be used.

Figure 6A:
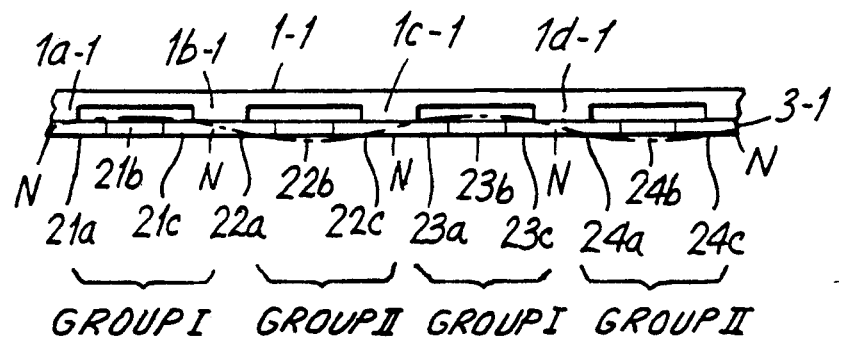
FIGS. 6a-6d schematic diagrams showing a method for shifting the nodes in accordance with the invention.

In FIG. 6a, the vibrators 21a, 21b, 21c, 23a, 23b and 23c form a first group and the vibrators 22a, 22b, 22c, 24a, 24b and 24c form another group. Then, the two groups are driven so that they are displaced in opposite directions. Thus, in the vibration condition a node N is formed between the vibrator pair 21c and 22a, between the vibrators pair 22c and 23a, between the vibrator pair 23c and 24a and at each of the ends. As a result, each of the projections 1a-1 through 1d-1 of the rotor 1-1 is stabilized at the position corresponding to one of the nodes N. In FIG. 6a the broken lines each show the form of the vibration mode at a certain instant in time.

Figure 6B:
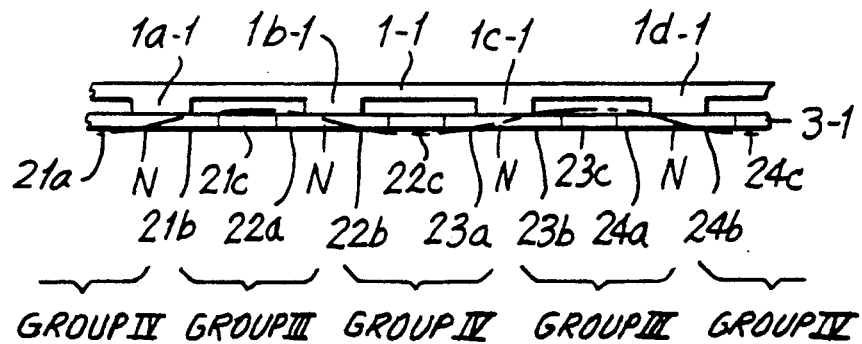
Figure 6C:
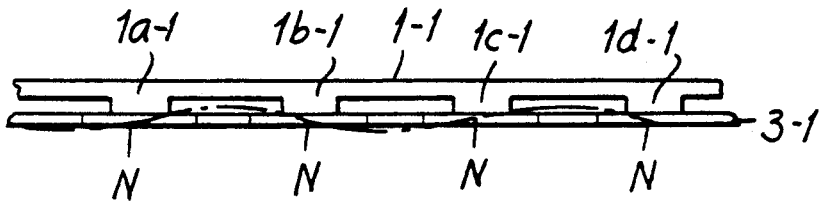
Figure 6D:
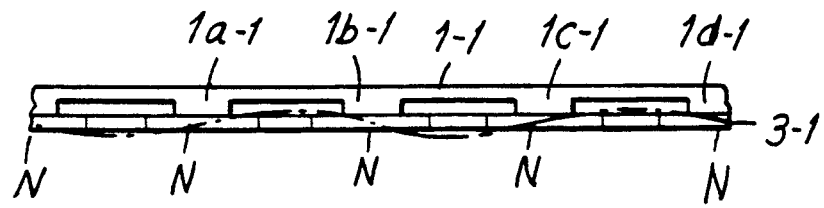

Referring now to FIG. 6b, the vibrators 21b, 21c, 22a, 23b, 23c and 24a form one group and the vibrators 22b, 22c, 23a, 24b, 24c and 21a form another group. Then, as the vibrators are driven such that the two groups are displaced in the opposite direction to each other, a node N is formed between the vibrator pair 21a and 21b, between the vibrator pair 22a and 22b, between the vibrator pair 23a and 23b and the vibrator pair 24a and 24b. As compared with FIG. 6a, the position of each node N is shifted to the right by an amount corresponding to one vibrator so that the contact positions of the projections 1a-1 through 1d-1, or the position of the rotor 1-1, is changed in a stepwise manner. By thus successively changing the vibration mode as shown in FIGS. 6c and 6d, rotor 1-1 is moved stepwise.

Figure 9:
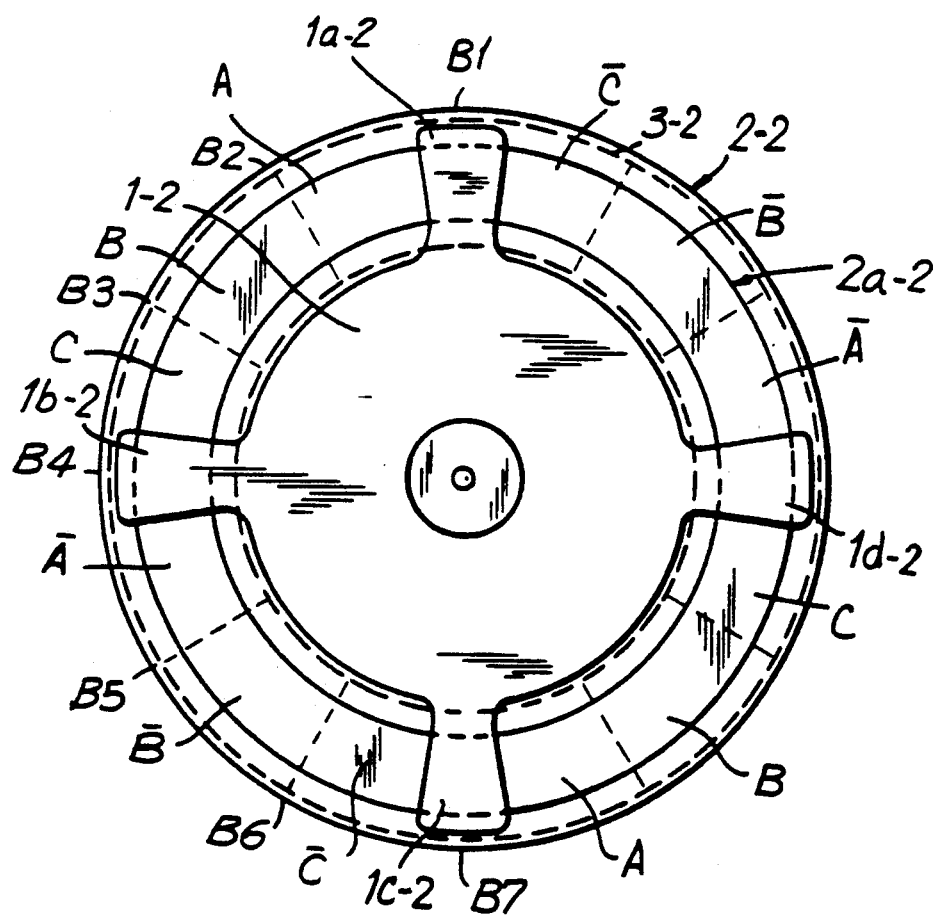
FIG. 9 is a top plan view of the stator and the rotor in an alternative embodiment of the invention.

Reference is now made to FIG. 9 in which an ultrasonic step motor for a rotary-type motor constructed in accordance with another embodiment of the invention is provided. Like numerals are utilized to indicate like structures. In this embodiment, a projection 2a is formed along the entire circumference of stator 2-2 and projections 1a-2 through 1d-2 are formed on a rotor 1-2 projecting diametrically from the center of rotor 1, projection 2a extending towards rotor 1-2.

Each of the constructions illustrated in FIGS. 7 and 9 correspond to an ultrasonic motor in which the rotor 1 and the stator 2 are brought into contact at four places (at the four projections). Also, a vibrating unit 107 composed of a piezoelectric unit 3 includes twelve vibrators as shown by the broken lines and they are designated by symbols A, B, C, $\overline{A}$, $\overline{B}$ and $\overline{C}$, respectively, thereby applying the same drive voltage to each pair of the same symbol. Also, symbols B1 through B7 sequentially indicate the possible node position of the vibrations. In this embodiment, the nodes N are formed at four places and the number of places where nodes N can be formed is twelve along the circumference.

Figure 10:
FIG. 10 is a schematic diagram of the stepwise driving of an ultrasonic motor demonstrating the conditions of the vibration modes of FIG. 9.

Reference is now made to FIG. 10 which illustrates the manner in which the ultrasonic step motor is driven stepwise. The diagrams of FIG. 10 are linearly developed for purposes of description with the symbols corresponding to those of FIG. 9. The broken lines show the forms of the vibration modes and the phase conditions of the voltages applied to the respective vibrators at these instances are indicated by the signs "+" and "−" for purposes of simplification.

In the vibration mode of B1, the vibrators A, B and C and $\overline{A}$, $\overline{B}$ and $\overline{C}$, respectively, form groups which vibrate with a 180° phase difference therebetween and therefore the projections 1a-1, 1b-2, 1c-2 and 1d-2 of rotor 1-2 are placed in the illustrated positions. In the vibration mode of B2, the vibrators B, C and A and $\overline{B}$, $\overline{C}$ and $\overline{A}$, respectively, form groups, whereas in the vibration mode of B3, the vibrators C, A and B and $\overline{C}$, $\overline{A}$ and $\overline{B}$, respectively form groups. In this way, the vibration modes of B3 through B6 are repeated and the rotor 1-2 is moved in a stepwise manner. In the rotary type motor of FIG. 9, one rotation is completed by twelve steps.

Conversely, if the rotor is moved in steps in the opposite direction to the illustrated vibration modes of B1 through B6, that is, if switching is effected so that the vibration mode of B2 is obtained after the vibration mode of B3, the rotor 1-2 is moved in a direction opposite to that described above. As is apparent from the description of FIG. 10, it will be seen that the ultrasonic step motor can be easily constructed as a linear motor.

Figure 11:
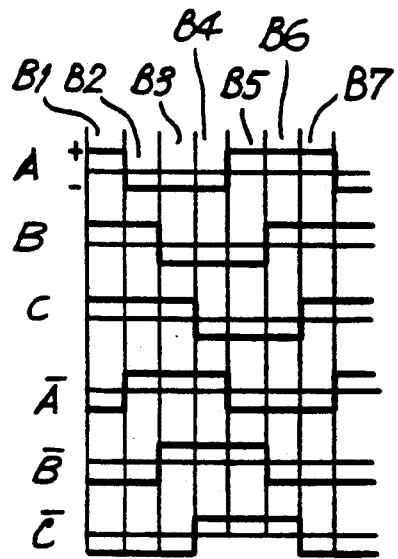
FIG. 11 is a timing chart of the phases of the driving voltages of the ultrasonic step motor of FIG. 9.

Reference is now made to FIG. 11, a timing chart of the phases for providing the vibration modes shown in FIG. 10. To produce the vibration modes of B1, the drive voltages of the positive (+) phase are applied to the vibrators A, B and C and the drive voltages of the negative (−) phase are applied to the vibrators $\overline{A}$, $\overline{B}$ and $\overline{C}$. These drive voltages are produced by control circuit 103 so that if the output signal 105a from the oscillation circuit 105 has the positive (+) phase, the oppositely phased output signal 106a of the output signal 105a of the oscillation circuit 105 has the negative (−) phase and switching is effected at the timing of the control signal 102a from the frequency divider circuit 102. It is to be noted that while six different kinds of drive control signal 103a are necessary for vibrators A, B, C, $\overline{A}$, $\overline{B}$ and $\overline{C}$, an inverse relationship exists between vibrators A and $\overline{A}$, between B and $\overline{B}$, and between C and $\overline{C}$, and therefore the equivalent operation can be obtained with three distinct drive control signals by reversing the direction of polarization.

Figure 12:
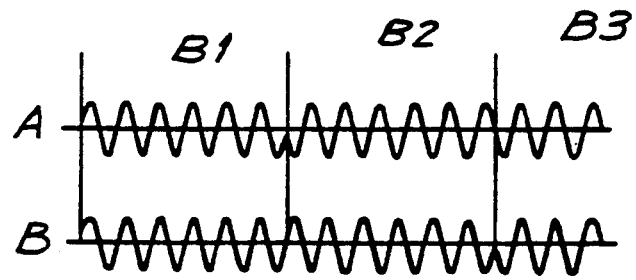
FIG. 12 is a timing chart of the driving voltages input to the ultrasonic step motor of FIG. 9.

Reference is now made to FIG. 12, a timing chart of the drive voltages applied to vibrators A and B, respectively. As can be seen, the oppositely-phased drive voltages are applied to the vibrators A and B in the vibration mode of B2 and the drive voltage of the same phase are applied to the vibrators A and B in the vibration mode B3. At this time, the drive voltages in the respective vibration modes are sinusoidal waves and their frequencies are selected to coincide with the resonant frequency of the vibrators attached to the stator.

As will be seen from the foregoing description, the phases, of the drive voltages applied to the respective vibrators are suitably switched so as to realize a twelve-divisions per rotation step driving.

Figure 13:
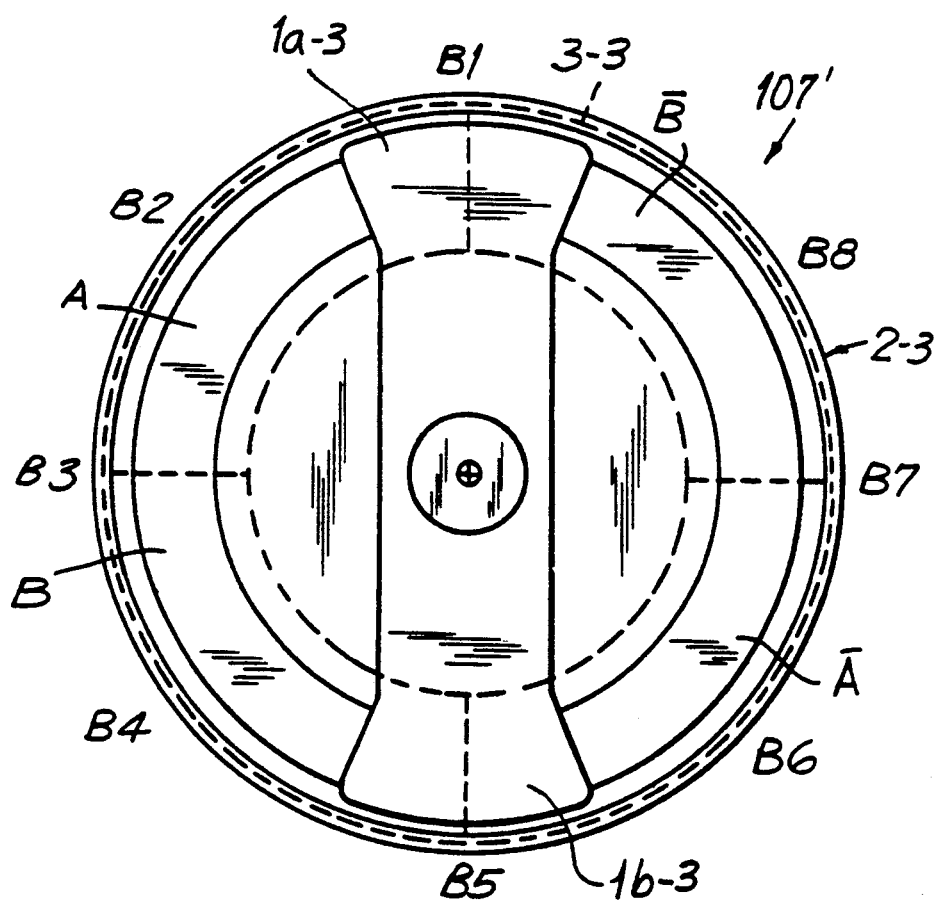
FIG. 13 is a top plan view of a rotor and a stator constructed in accordance with another embodiment of the invention.

Reference is now made to FIG. 13, in which an ultrasonic step motor constructed in accordance with another embodiment of the invention is provided. Like numerals are utilized to indicate like structure. Vibrating unit 107 includes four vibrators A, $\overline{A}$, B and $\overline{B}$. A rotor 1-3 contacts a stator 2-3 at two contacting portions 1a-3 and 1b-3. The number of nodes N is two and the number of positions where nodes N can be produced is eight.

Reference is made to FIG. 14, showing the vibration modes and the positional relations of the contacting portions 1a-3 and 1d-3. FIG. 15 is a timing chart of the phases of the drive voltages for producing the vibration modes of FIG. 14.

FIG. 16 is a timing chart of the drive voltages applied to the vibrators A and B. In FIG. 15, the signs "+" and "−" show the oppositely phased conditions and the absence of a sign indicates the condition where no drive voltage is applied. As a result, this embodiment realizes an ultrasonic step motor of eight-division steps (⅛ step) per rotation.

It is to be noted that while the above-described embodiment shows by way of example a rotary type motor, the invention is not limited with respect to this specific construction. The forms of vibration, the kinds and constructions of vibrators are applicable to other motors provided that the rotor is shifted to the driving nodes and the one driving manner of the vibrators is sequentially changed thereby moving the rotor in a stepwise fashion. In addition, the oscillation circuit 105 may be adapted to utilize the output of the crystal oscillator circuit 101 and also it may be a self-excited oscillation circuit which detects the vibrations of the vibrating unit 107 to resonate under the optimum conditions. Also, there will be no inconvenience even if the control signal 102a is not based on the signal from the crystal plate 100.

Further, after the ultrasonic step motor has been moved to the desired position, friction exists due to the friction forces acting between the rotor and the stator and therefore the rotor's stop position is maintained even if driving is stopped. As described hereinabove, the ultrasonic step motor can be suitably preset, its step angle depending on the number of vibrators and the driving method. The present invention is in no way limited to the previously mentioned embodiments.

Figure 17:
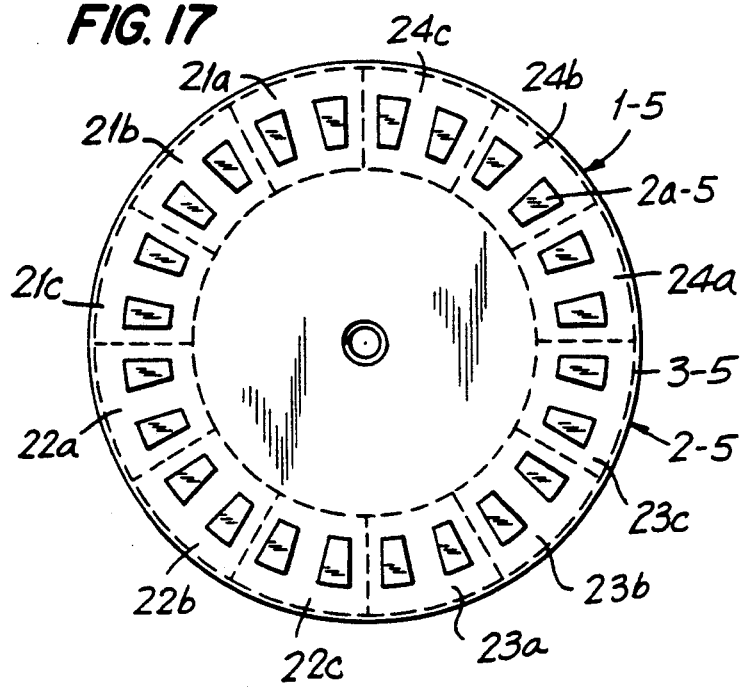
FIG. 17 is a top plan view of a stator constructed in accordance with the invention with a piezoelectric element shown in phantom.
Figure 18A:
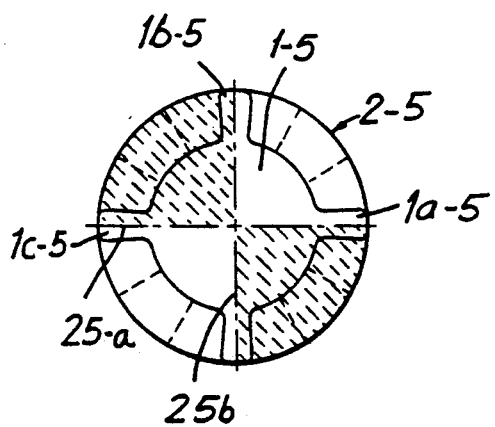
FIGS. 18a-18d are schematic diagrams of the positional relationship between the vibration modes of the stator and the rotor rotating in the stepwise manner by 30 degrees.
Figure 18C:
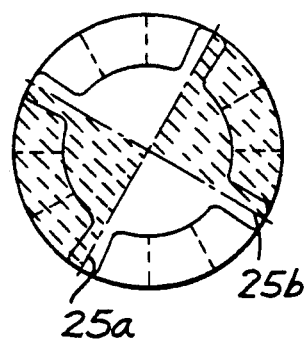
Figure 18B:
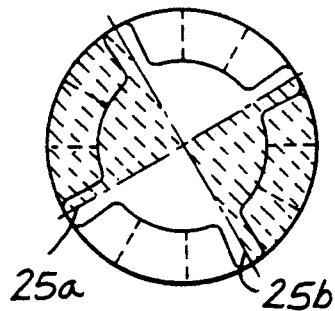
Figure 18D:
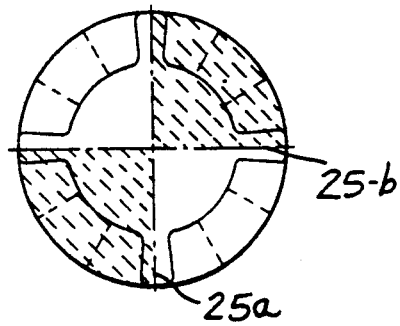

Reference is now made to FIG. 17 showing another embodiment of a stator 2-5. Stator 2-5 includes twenty four projections 2a-5 disposed about the circumference of stator 2-5. A piezoelectric unit 3-5 is coupled to stator 2-5. In an exemplary embodiment piezoelectric unit 3-5 includes twelve vibrating devices 21a, 21b, 21c, 22a, 22b, 22c, 23a, 23b, 23c, 24a 24b and 24c. The twelve vibrating devices operate in a manner as shown in connection with piezoelectric unit 3-1 (FIGS. 6a–6d). Projections 1a-5–1d-5 of rotor 1-5 need only partially contact stator 2-5. In this manner, projections 1a-5 through 1d-5 project the thickness direction or the diameter direction of stator 2-5.

Reference is now made to FIGS. 18a–18d in which the relationship between the stages of vibration of stator 2-5 and rotor 1-5 when the motor is driven in the manner of FIGS. 6a-6d. Stator 2-5 has two node diameters 25a and 25b and projections 1a-5–1d-5 of rotor 1-5 are stable when positioned at node diameters 25a and 25b. Therefore, the stage of the vibration as shown has two portions in reverse phase with respect to one another, one defined with hatches and another defined without hatches. These portions sequentially change as shown in FIGS. 18a-18d so that rotor 1-5 seeking stable positioning rotates in stepwise manner by 30 degrees.

Figure 19A:
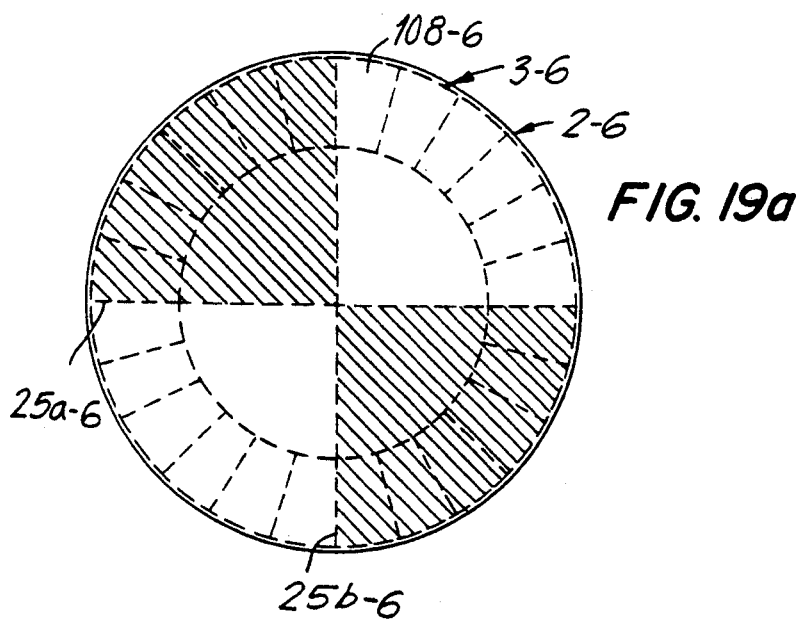
FIGS. 19a-19c are schematic diagrams of the positional relationship between the vibration mode of the stator and the rotor rotating in a stepwise manner by 15 degrees.
Figure 19B:
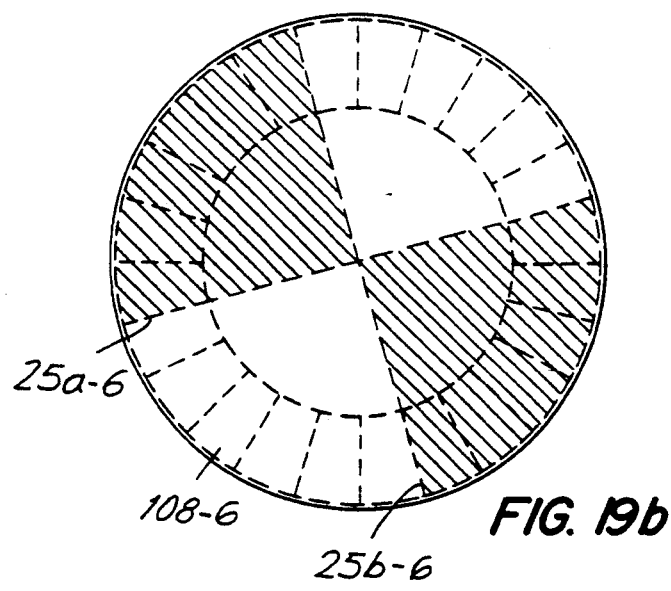
Figure 19C:
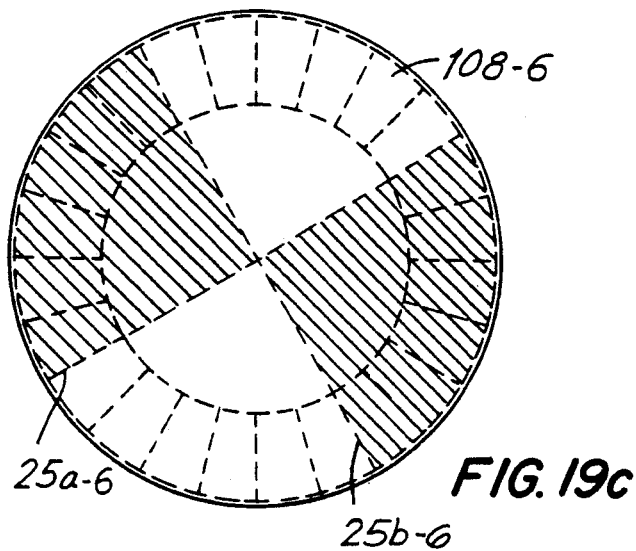

FIGS. 19a-19c disclose an embodiment of an ultrasonic step motor constructed in accordance with the invention having a step angle of 15 degrees rather than 30 degrees as disclosed in FIGS. 18a-18d. A piezoelectric unit 3-6 is coupled to a stator 2-6. Piezoelectric unit 3-6 has twenty four vibrating devices 108-6. As discussed above, the driving of two groups of twelve vibrating devices shifted one by one also produces two node diameters 25a-6 and 25b-6 exhibiting vibration modes of the motor changes shown.

Figure 20A:
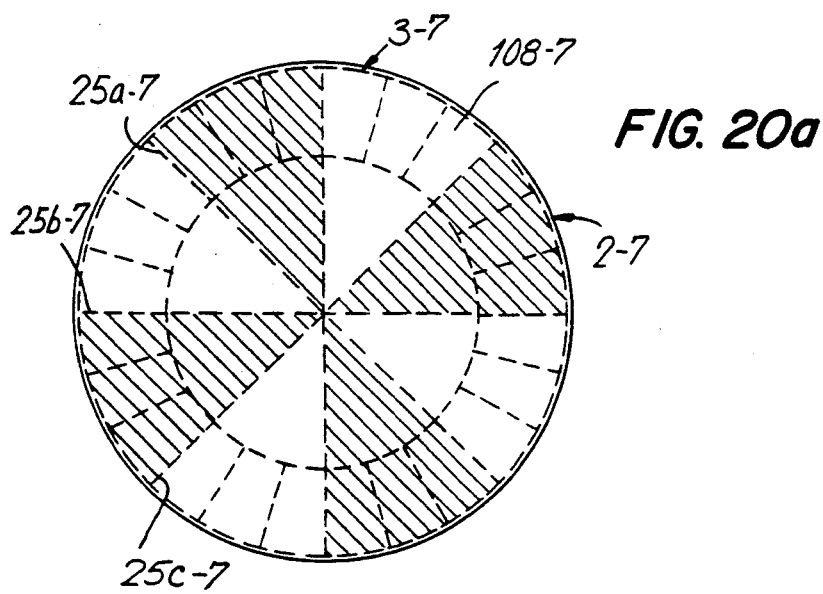
FIGS. 20a-20c are schematic diagrams of the positional relationship between the vibrator mode of the stator and the rotor rotating in a stepwise manner in accordance with another embodiment of the invention.
Figure 20B:
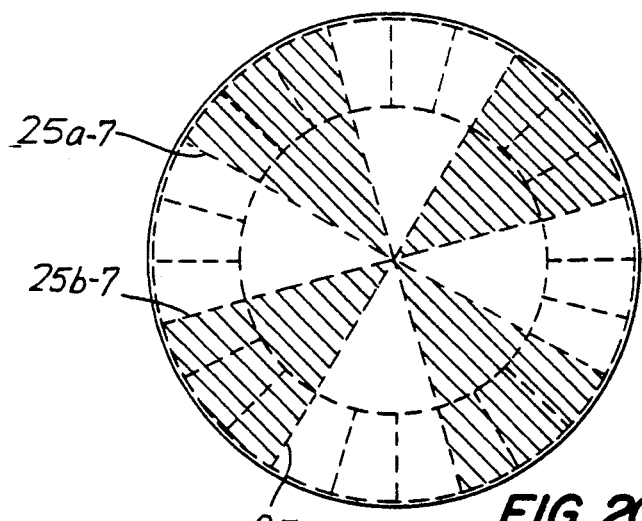
Figure 20C:
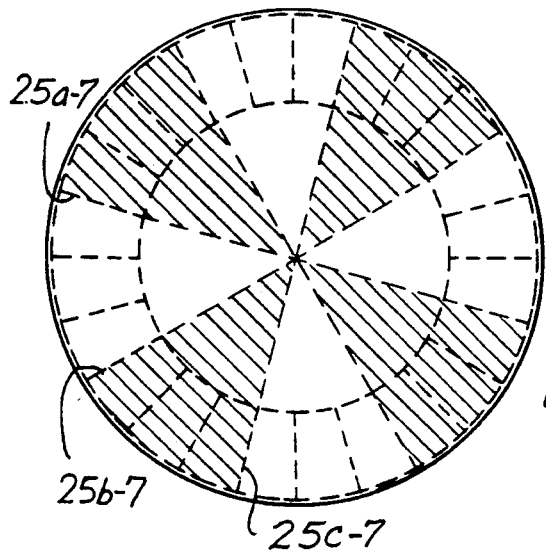

Another embodiment of vibration mode of the stator of the ultrasonic step motor is shown in FIGS. 20a-20c. Piezoelectric unit 3-7 is coupled to a stator 1-7. Piezoelectric unit 3-7 has twenty four vibrating devices. This arrangement produces four sets of three adjacent vibrating devices 108-6 forming a first group and the remaining twelve vibrating devices forming a second group of three adjacent vibrating devices 108-6. When driven, three node diameters 25a-7, 25b-7 and 25c-7 are formed. By driving the groups of vibrating devices 108-7 by sequentially shifting from groups of three to groups of three, rotor 1-7 is driven stepwise by 15 degrees. Accordingly, a stage of vibration of 4λ is formed. Therefore, the step angle of the ultrasonic step motor may be set according to the number of vibrating devices and a driving process. Further, the angle is not limited to the embodiments set forth and detailed above.

Figure 21:
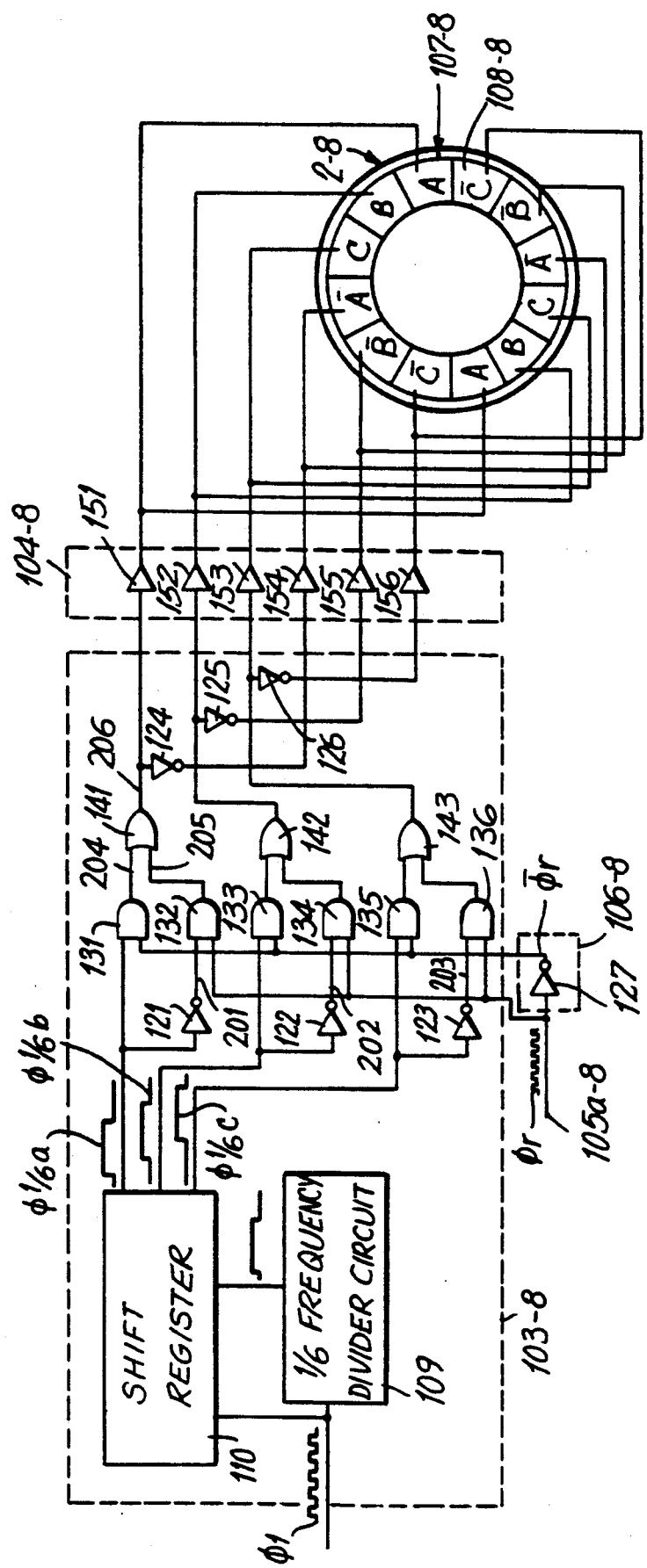
FIG. 21 is a circuit diagram of a drive control apparatus for an ultrasonic step motor constructed in accordance with the invention.

Reference is now made to FIG. 21 in which a circuit diagram for a drive control apparatus for an ultrasonic step motor is provided for describing the drive control system. As discussed above, the drive system includes a control circuit 103-8, a phase inverting circuit 106-8 and a drive 104-8.

Control circuit 103-8 receives a signal φ1 corresponding to signal 102a output by frequency divider circuit 102. Signal φ1 is input to a shift register 110 and a 1/6 frequency divider circuit 109. 1/6 frequency divider circuit 109 divides the circuit by six and provides an output to shift register 110. Shift register 110 outputs three signals, φ 1/6a, φ 1/6b, and φ 1/6c, respectively at time shifted intervals.

An inverter 121 receives the φ 1/6a signal and produces an inverted signal 201. Similarly, an inverter 122 receives signal φ1/6b and produces an inverted signal 202 and inverter 123 receives φ 1/6c and outputs an inverted signal 203. Simultaneously, phase inverting circuit 106 receives a clock signal φ$_r$ on line with signals 105a and passes the signal through an inverter 127 and outputs a phase inverted signal φ$_r$.

Control circuit 103 includes a plurality of AND gates 131-136. AND gate 131 receives as one input φ 1/6a and as its other input the inverted signal φ$_r$ output by phase inverting circuit 106 and produces a signal 204. AND gate 132 receives the output of inverter 121, the inverted φ 1/6b, as one input and the output of oscillation circuit 105, φ$_r$ as its second output and outputs a signal 205. AND gate 133 receives signal φ 1/6b as one input and the inverted signal φ$_r$ as its second input.

AND gate 145 receives the signal φ 1/6c as its one input and the inverted signal φ$_r$ as its second input.

The outputs of the AND gates are then gated a second time by OR gates 141, 142 and 143. Specifically, the outputs of AND gates 131 and 132 corresponding to signals 204, 205 respectively are the inputs for OR gate 141. Similarly, the outputs of AND gates 133, 134 provides the inputs of OR gate 142. AND gates 135, 136 provide the inputs for OR gate 143.

The outputs of OR gates 141, 142 and 143 are in fact utilized to drive vibrators 108-8 A, B, C, $\overline{A}$, $\overline{B}$ and $\overline{C}$ of vibrating unit 107-8. As discussed above, only three signals need be utilized to drive all twelve vibrators. Accordingly, the outputs of OR gates 141, 142 and 143 are utilized to drive all twelve vibrators 108-8 of vibrator unit 107-8. Specifically, OR gate 141 outputs a signal 206 which is input to an amplifier 151 of driver 104-8 and is passed through an inverter 124 to a second amplifier 154 of driver 104-8. Amplifier 151 and amplifier 154 provide signals which are the inverted version of each other. Accordingly, amplifier 151 provides an input to both vibrators 108-8 which are designated as A. Similarly, the output amplifier 154 provides an output to drive both vibrators 108-8 designated at $\overline{A}$. Similarly the output of OR gate 142 is directly input to driver 104-8 and is passed through an amplifier 152 to vibrators 108-8 indicated as B as well as being inverted by an inverter 125 which in turn passes through an amplifier 155 for driving vibrators 108-8 indicated as $\overline{B}$. The same is also true of OR gate 143 which provides an output which is directly input to driver 104-8 and amplified by amplifier 153 for driving vibrators 108-8 indicated as C as well as having its signal inverted by an inverter 126 prior to the input to driver 104-8 and amplified by an amplifier 156 coupled to vibrators 108-8 indicated as $\overline{C}$.

This embodiment shows by way of example a circuit construction for one-step (30°) per second driving of an ultrasonic step motor having a 2λ vibration mode for twelve division steps per rotation. Although not shown in FIG. 21, the crystal oscillator circuit 101 and the frequency divider circuit 102 of FIG. 1 may utilize the same circuit construction conventionally known from electronic watches. Oscillation circuit 105 may include by way of example a CR oscillation circuit or self-excitation oscillation circuit.

Figure 22:
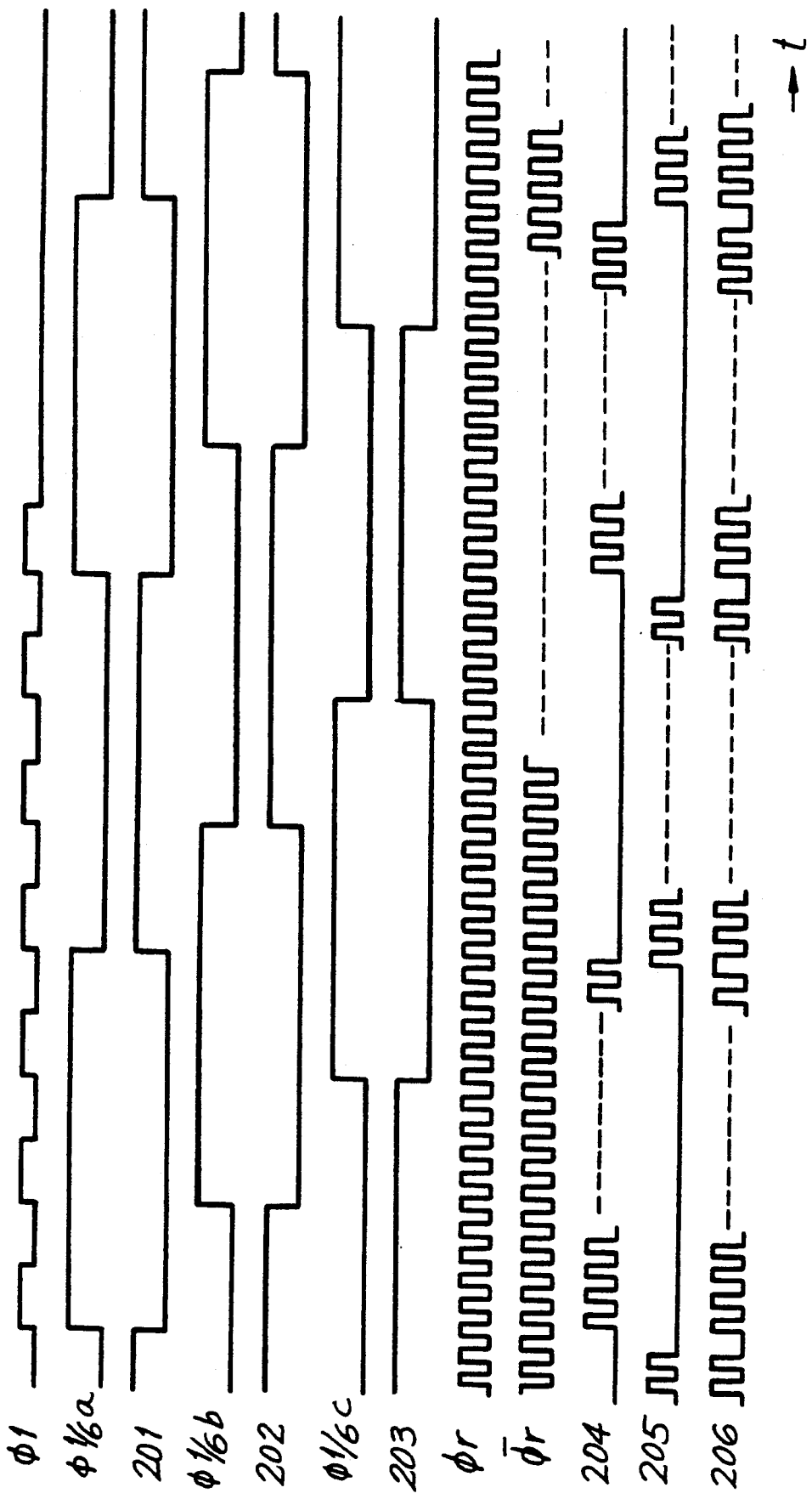
FIG. 22 is a timing chart disclosing the operation of the drive control apparatus of FIG. 21.

Reference is now made to FIG. 22, a timing chart showing the operation of the drive control apparatus of FIG. 21. A 1 Hz control signal φ1 is output by frequency divider circuit 102. 1/6 frequency divider circuit 109 generates a signal subjected to 1/6 frequency division and the signal is input to shift register 110. Thus, shift register 110 generates 1/6 Hz signals φ1/6a, φ1/6b and φ1/6c which are shifted in phase by 1 second from one another and which are each shifted in phase every 3 seconds.

Then, the signal φ1/6a is input to AND gate 131 and is also inverted by the inverter 121 thereby applying the resulting signal 201 to AND gate 132. The output signal φ$_r$ of the phase inverting circuit 106 is input to AND gate 131. AND gate 132 also receives the oscillation signal φ$_r$ from the oscillation circuit 105. As a result, AND gate 131 generates an output signal 204 representing the logical product of the signal φ1/6a and the output signal φ$_r$. The AND gate 132 generates an output signal 205 representing the logical product of the inverted signal 201 of the signal φ1/6a and the oscillation signal φ$_r$. Then, these output signals 204 and 205 are supplied to amplifier 151 through the OR gate 141 whose output is also supplied to the amplifier 154 through the inverter 124.

The operation on signals $\phi1/6b$ and $\phi1/6c$ is the same as in the case of the signal $\phi1/6a$ so that after their inverted signals 202 and 203 have been obtained, the signals are processed in the same way as in the case of the signal $\phi1/6a$. The resulting drive control signals, applied respectively to amplifiers 152, 153, 155 and 156, are respectively shifted in phase by 1 second with respect to the drive control signals to the vibrators A and A. Thus, the driver 104 outputs six distinct drive voltages so that in response to the applied drive control signal, each of the amplifiers applies the drive voltage vibrating at the frequency of the oscillation signal $\phi_r$ to the vibrators 108-8 thereby momentarily driving two vibrators 108-8 at the same time. As a result, vibrators 108-8 are driven, three at a time, in the same phase or the opposite phase so that the flexure vibrations of $2\lambda$ are produced and these vibrations drive the rotor 1 in a stepwise manner.

A sine wave is an ideal wave for the drive voltage. In order to have drive voltage formed as a sine wave, a filter circuit (not shown) is provided to pass a frequency component of the oscillation signal. For example, a filter circuit may be placed after the output of the driver 104-8 thereby converting the drive voltages to sinusoidal waves.

Figure 23:
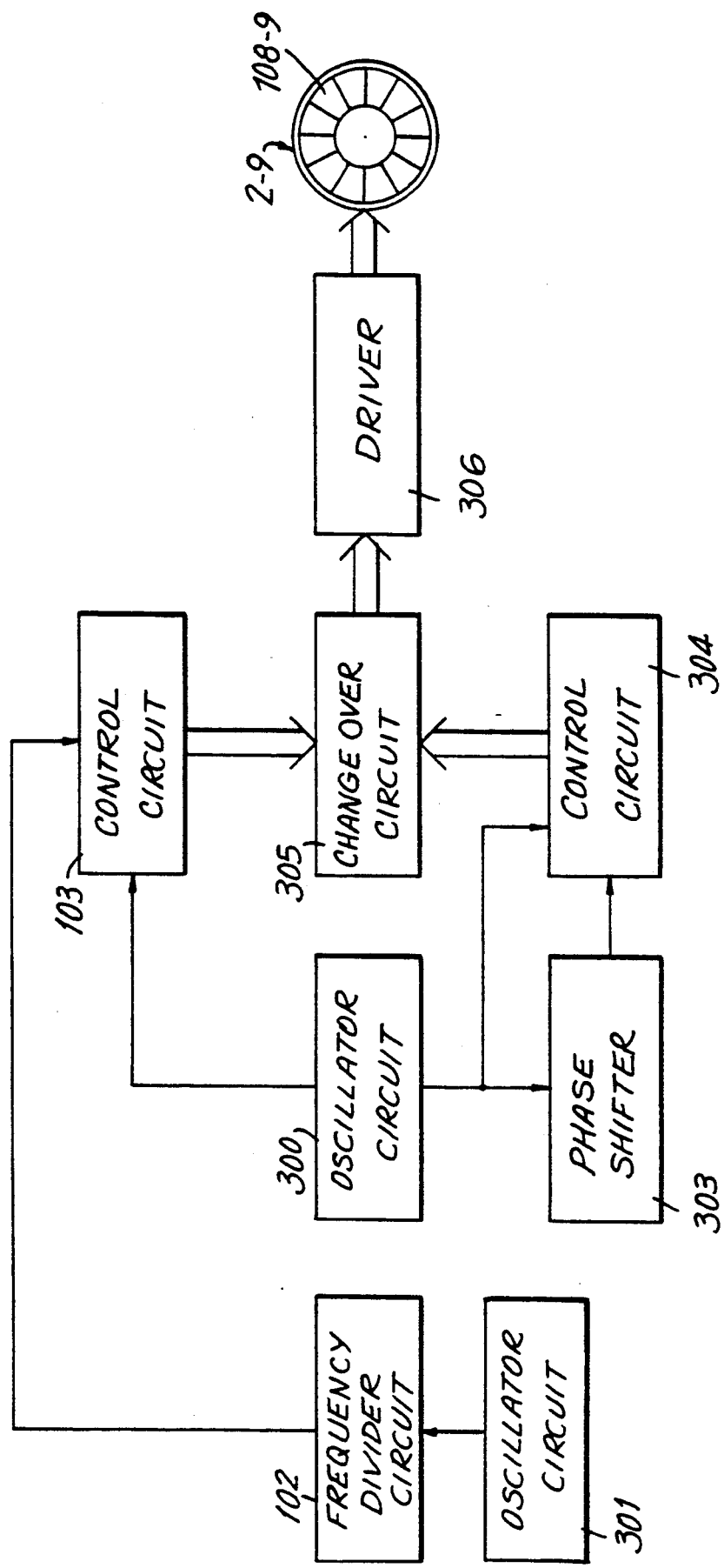
FIG. 23 is a block diagram of an ultrasonic a driving system for an ultrasonic step motor constructed in accordance with another embodiment of the invention.

Reference is made to FIG. 23 in which a block diagram of a control circuit for an ultrasonic step motor constructed in accordance with another embodiment of the invention is provided. This circuit allows for selection between operation of the ultrasonic motor as a stepwise driven and continuous driven ultrasonic motor. An oscillation circuit 301 provides an input to a frequency dividing circuit 102. Frequency dividing circuit 102 outputs a divided frequency to a control circuit 103 similar to the embodiment of FIG. 1. Control circuit 103 also receives an output from an oscillation circuit 300. Oscillation circuit 300 also provides an output to a phase shifter 303 as well as a second control circuit 304 which also receives output from phase shifter 303. In response to these inputs, control circuit 304 outputs a signal to change over circuit 305. Change over circuit 305 also receives an input from control circuit 103 and in response thereto outputs a signal to driver 306 which in turn drives vibrators 108-9 provided on a stator 2-9.

Oscillation circuit 300 outputs the signals for stator 2-9. Phase shifter 303 shifts the phase of the output signals by 90° so that control circuit 304 receives two signals 90° out of phase with each other. Control circuit 304 generates an advancing wave of drive wave shape. Change over circuit 305 outputs a stepwise drive in response to input control circuit 103 when step drive mode is selected and a continuous drive in response to output control circuit 304 when a continuous drive is selected to oscillate stator 2-9.

Figure 24A:
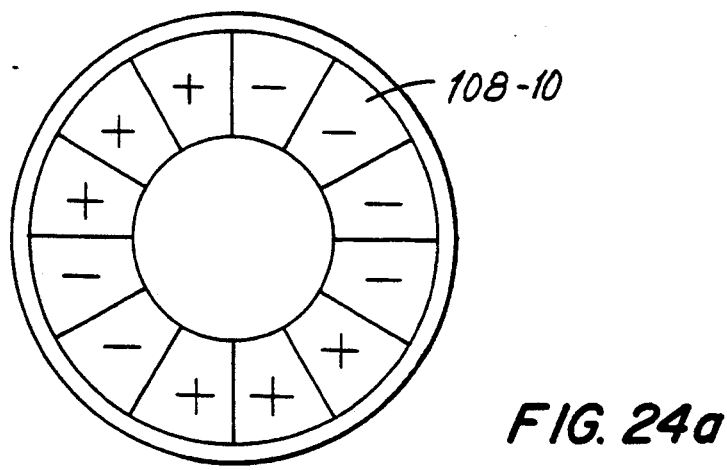
FIG. 24a is a schematic diagram of an oscillation process of a standing wave of $2\lambda$ of an oscillation mode of 2 wavelengths generated in a stator.
Figure 24B:
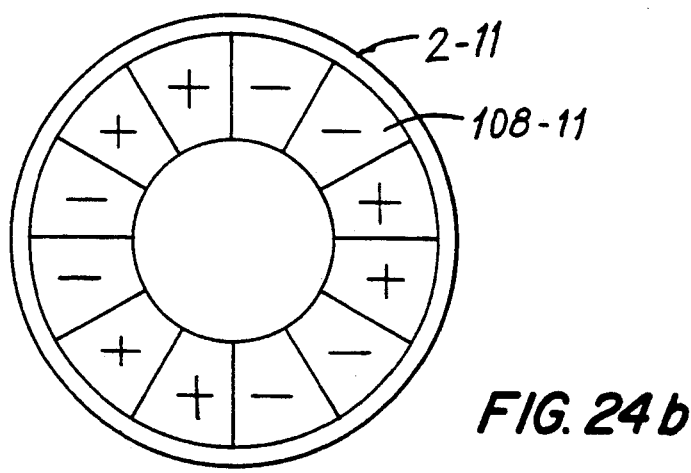
FIG. 24b is a schematic diagram of an oscillation process of a stator being oscillated with a stage of vibration of $3\lambda$.

Reference is now made to FIG. 24a wherein an oscillation process when a standing wave of $2\lambda$ of an oscillation mode of two wave lengths is generated in the stator is diagrammatically represented. The vibrating devices 108-10 are grouped in two groups of three each group having positive (+) or negative (−) phases, thereby being reversed with respect to one another. The oscillation nodes are generated in the broken line direction as shown in FIG. 24a. With a stepwise vibration, the projections of the rotor are forced toward the node positions. Accordingly, the stepwise movement of the rotor is attained by simultaneously and gradually shifting and driving the combination of vibrating devices. Positive (+) and negative (−) displacement of a vibrating device 108-10 can attained by selecting positive and negative voltages or inverting the polarizing direction. FIG. 24b discloses a stator 2-11 being oscillated with a stage of vibration of $3\lambda$ wherein vibrating devices 108-11 are driven in alternating groups of two resulting in the generation of three nodes.

Figure 25:
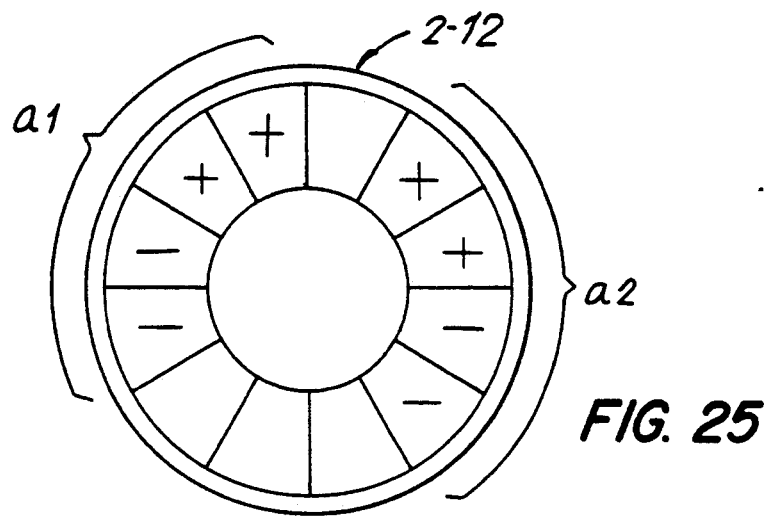
FIG. 25 is a schematic diagram of a stator being oscillated with an oscillation mode of $3\lambda$.

FIG. 25 depicts a stator 2-12 oscillated with an oscillation mode of $3\lambda$. The oscillation of stator 2-12 is attained by impressing a wave shape phase shifted by 90°. As shown in FIG. 25, the positive (+) and negative (−) phases labelled a1 are standard. While, the positive (+) and negative (−) phases labelled a2 are separated by $\frac{1}{4}\lambda$ from the a1 parts. This causes the next wave shape to be reversed from the former wave shape and therefore be shifted 90 degrees with respect to one another. The invention of the embodiment of FIG. 25 resides in the change over between an advancing wave and a standing wave, so that the oscillation mode is not limited to the mode set forth and detailed above wherein a step occurs with the oscillation of vibration.

Figure 26A:
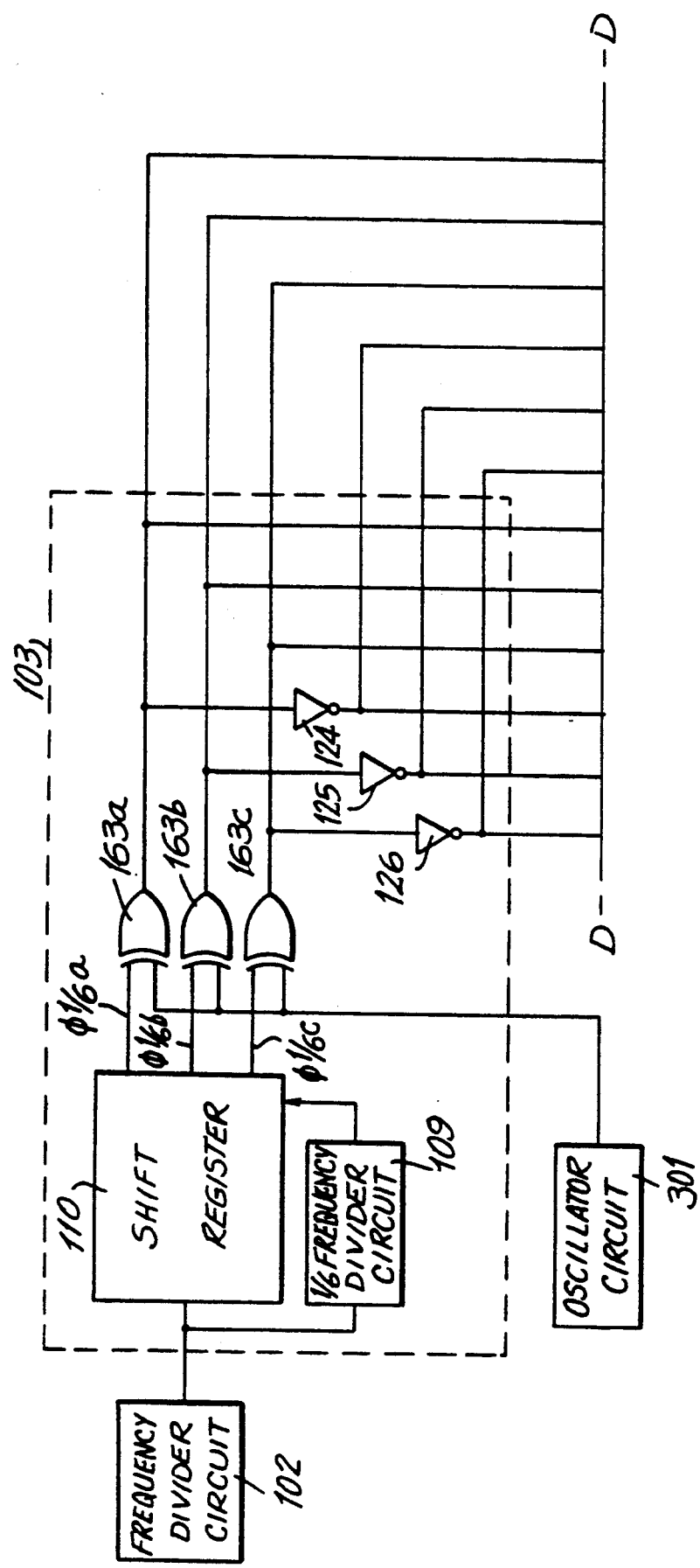
FIG. 26a is a circuit diagram a portion of the drive control apparatus of FIG. 23 constructed in accordance with the invention.
Figure 26B:
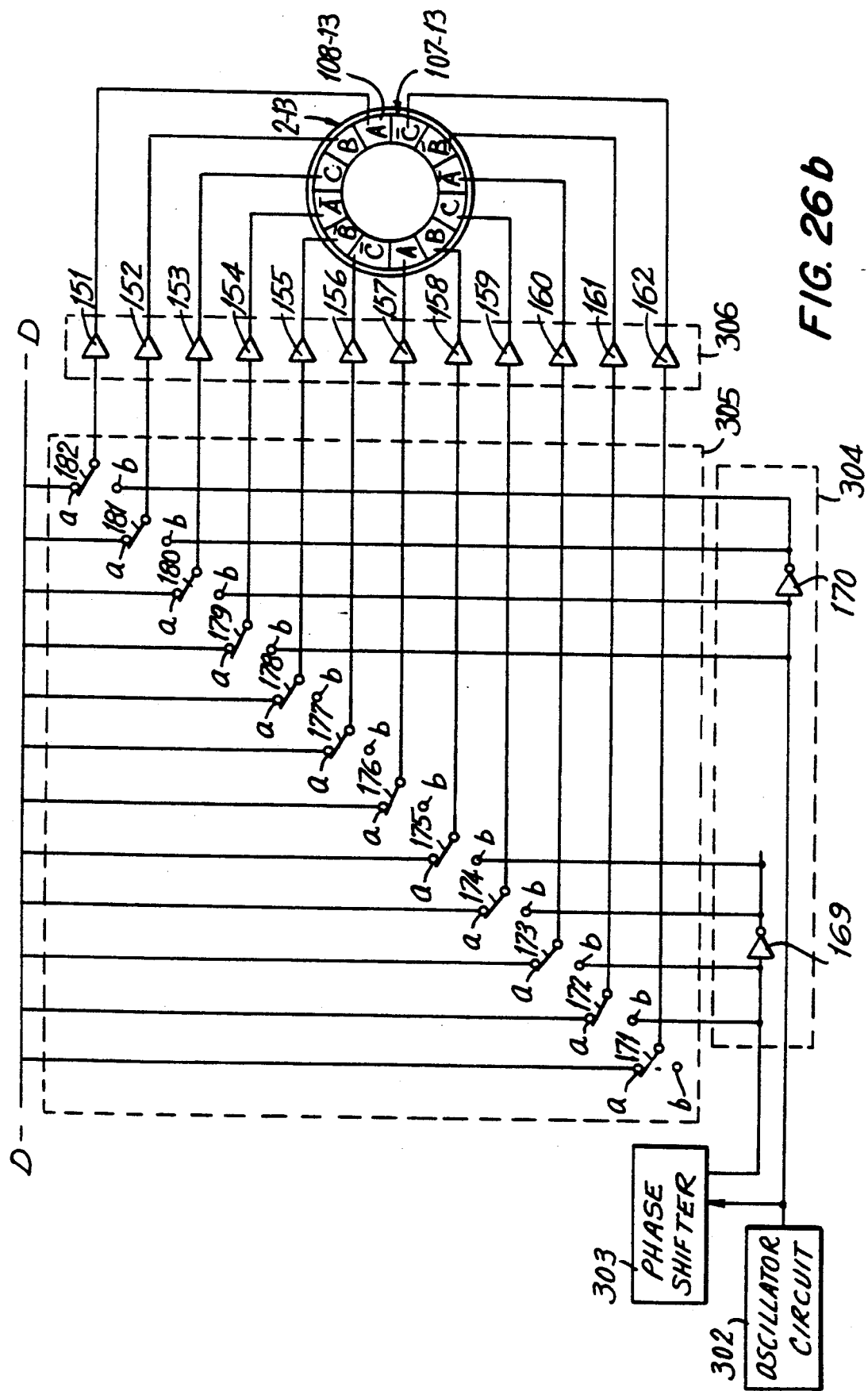
FIG. 26b is a circuit diagram a portion of the drive control apparatus of FIG. 23 constructed in accordance with the invention.

FIGS. 26a and 26b show circuits of the embodiment of the block diagram shown in FIG. 23. A changing over between a $2\lambda$ standing wave and $3\lambda$ advancing wave in accordance with change over circuit 305 will be explained with reference to the drawings of FIGS. 26a and 26b. Oscillation circuit 300 of FIGS. 26a and 26b has two oscillation circuits 301 and 302 for $2\lambda$ and $3\lambda$ respectively.

As seen from FIG. 26a, control circuit 103 includes a 1/6 frequency divider 109 and a shift register 110 which receive an input from frequency dividing circuit 102 as previously discussed in FIGS. 23 and 21. Three EXCLUSIVE OR gates 163a, 163b, 163c each receive as one input the output of oscillator circuit 301 and as its second input one of shifted divided signals $\phi1/6a$, $\phi1/6b$ and $\phi1/6c$, respectively. The outputs of the respective EXCLUSIVE OR gates 163a -163c each provide four outputs, to create a total of twelve outputs corresponding to the number of vibrating devices 108-13. An output of each said EXCLUSIVE OR gates is inverted through a respective inverter 124, 125, 126 prior to being output by control circuit 103 so that ten of its outputs of each EXCLUSIVE OR gate is inverted.

The configuration of this portion of the circuit is substantially similar to that of the circuit shown in FIG. 1. Accordingly, the various parts of the circuit function according to the timing chart shown in FIG. 22. Therefore, it is possible to output drive signals for stepwise feeding the rotor by 30°.

The output of control circuit 103 is input to change over circuit 305. Change over circuit 305 includes a plurality of switches 171-182 coupled between the respective outputs of control circuit 103 and the outputs of phase shifter 303, oscillation circuit 302 and driver 306. Driver 306 includes a plurality of amplifiers 151 through 162 each coupled to a respective switch 171 through 182 and a respective vibrating element 108-13 as discussed in greater detail in connection with the circuit of FIG. 21.

Switches 171-182 are permanently coupled to driver 306. Each switch switches between an A side coupled to the output of control circuit 103 and a B side coupled to either the output of phase shifter 303, the output of phase shifter 303 having been inverted by an inverter 169, the output of oscillation circuit 302 or the output of oscillation circuit 302 after it has been inverted by invertor 170. Inverters 169 and 170 make up a portion of control circuit 304.

Accordingly, as can be seen from above, to produce stepwise driving, switches 171–182 are all turned to the A side or the side coupled to control circuit 103. Switches 171–182 are also adapted to cooperate with control circuits 303 and 304. Accordingly, when switches 171–182 are switched to the B side, the rotor continuously rotates in an advancing wave vibration mode. Oscillation circuit 302 oscillates at a resident frequency of 3λ and phase shifter 303 generates signals shifted by 90°. Switches 171–182 of change over circuit 305 are cooperatively turned to the B side. Control circuit 304 has inverters 169–70 to generate the inverted wave shapes of phase shifter 303. Oscillation circuit 302 and the wave shapes produced therefrom are supplied to the vibrating device 108.

Accordingly, a vibration mode having an advancing wave 3λ is realized, thereby the rotor rotates continuously. Various methods have been proposed to generate advancing waves and these methods are well known, so the method for generating advancing waves is not limited to that described above. The embodiment employs a combination of a standing wave of 2λ and an advancing wave 3λ. However, any other combinations can be used under the condition that the standing wave and the advancing wave can be changed-over and oscillated.

It is possible to reverse the moving direction of node positions when a stepwise driver is used. To reverse the rotating direction of the motor, it is necessary to invert the phase of the drive wave shape which to be inputted to vibrator device 108-10 when a continuous drive is used or reverse the direction of the advancing wave. The difference between the stepwise drive and the continuous drive is the difference between the driving methods of the motor. Accordingly, the motor which is driven stepwise can also be used as a continuous driven motor.

Figure 27A:
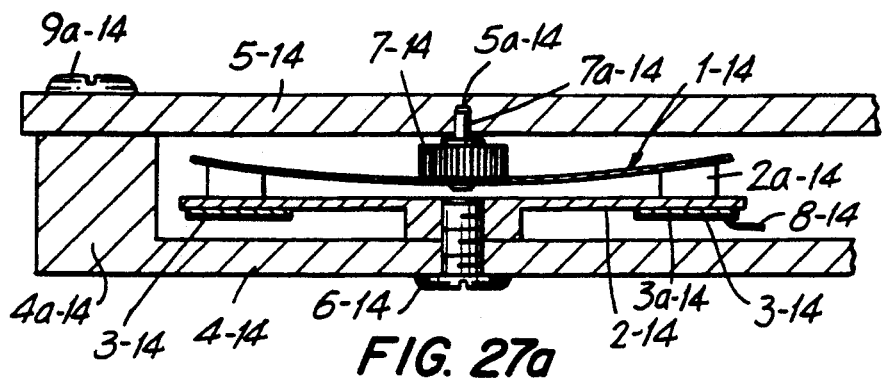
FIG. 27a is a cross-sectional view of an ultrasonic motor of still another embodiment of the invention.

FIG. 27a depicts an ultrasonic motor constructed in accordance with another embodiment of the invention. The construction of this embodiment is similar to that of FIG. 7. A rotor 1-14 is disposed upon and makes contact with a plurality of projections 2a-14 of a stator 2-14 and is frictionally driven by means of oscillation displacement. A pinion 7-14 is inserted into rotor 1-14 to transfer the associated rotational force as it rotates with rotor 1-14. A pivot 7a-14 integrally formed with pinion 7-14 is positioned in its transversal direction and its height or vertical direction by a wheel-train support 5-14. The gap between wheel-train support 5-14 and base plate 4-14 is determined by a projection 4a-14 between base plate 4-14 and wheel-train support 5-14. Wheel-train support 5-14 is secured to projection 4a-14 by a set screw 9a-14.

Rotor 1-14, constructed with a resilient member, is deflected as shown. Rotor 1-14 makes contact with projections 2a-14 of stator 2-14. Since the degree or amount of deflection of rotor 1-14 is greater than the estimated deflection in height direction of projection 2a-14, a stable contact condition is obtained. Based on the elasticity of rotor 2-14, a suitable pressing force is obtained creating a solid contact condition and a stable frictional force. Therefore, wheel-train receiver 5-14 causes a pressing force to be absorbed by rotor 2-14 of the ultrasonic motor regardless of other pressing forces produced in the embodiment.

Figure 27B:
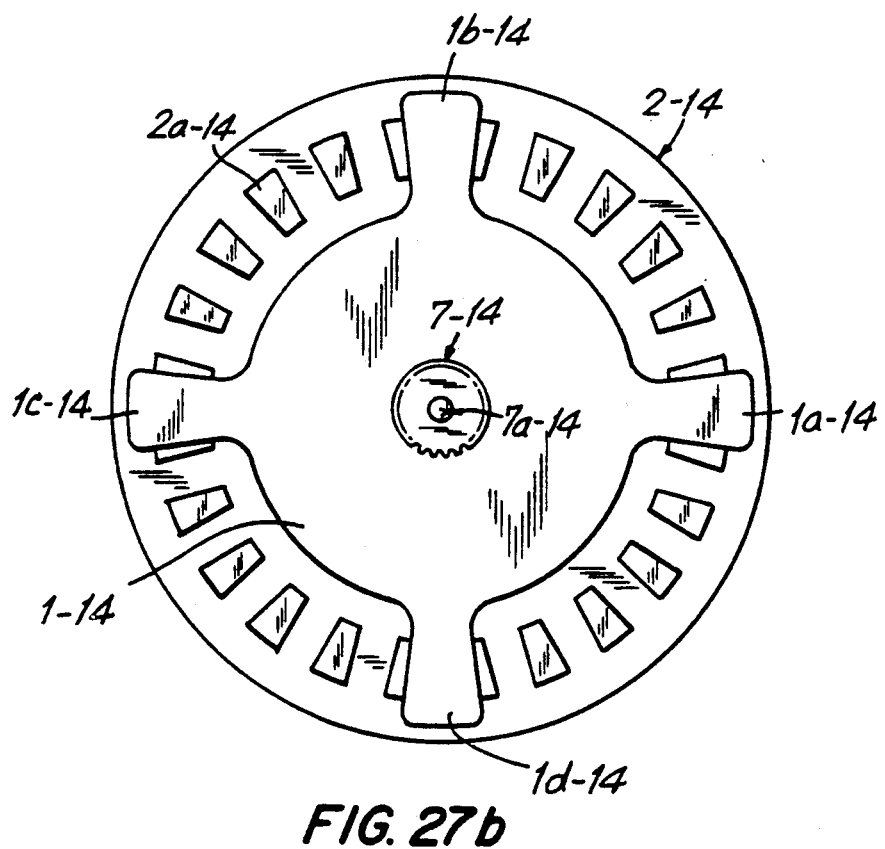

The relationship between rotor 1-14 and stator 2-14 of the ultrasonic motor can be seen in FIG. 27b. Four projections 1a-14 through 1d-14 on rotor 1-14 contacts a plurality of projections 2a-14 formed on stator 2-14. In this configuration, the flexibility of projections 1a-14 through 1d-14 is adjusted according to the width of projections 2a-14. Further, the flexibility can control and reduce the inertia of rotor 1-14.

Figure 28:
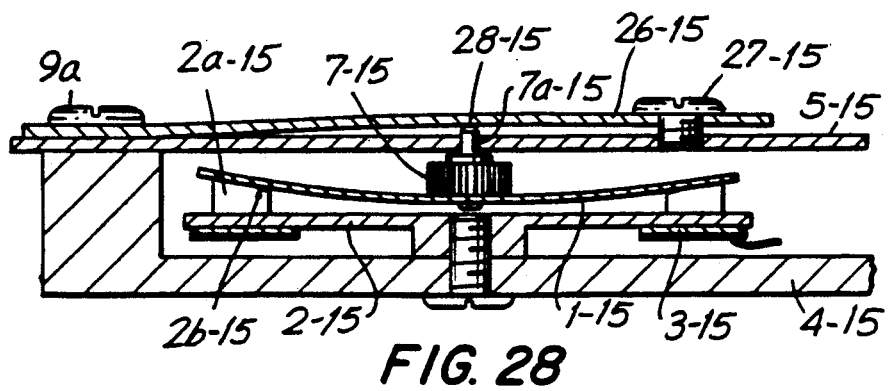
FIG. 28 is a cross-sectional view of an ultrasonic motor constructed in accordance with another embodiment of the invention.

Reference is now made to FIG. 28, in which another embodiment constructed in accordance with the invention is provided. The ultrasonic step motor of FIG. 28 includes stator 2-15 supported on a base plate 4-15. Stator 2-15 is formed with projections 2a-15 at one side and a piezoelectric element 3-15 disposed on its opposite side. A rotor 1-15 is mounted on projections 2a-15. A pinon 7-15 is disposed on rotor 1-15 and is supported by pivot 7a-15 which extends through a train wheel support 5-15. A pressing plate 26-15 is affixed to wheel train support plate 5-15 at one end by a screw 9a and at another end by a screw 27-15.

Wheel-train support 5-15 is controlled b rotating adjusting screw 27-15. A portion 28-15 of plate 26-15 contacts the top of pivot 7a-15 of pinion 7-15. The height of portion 28-15 is also controlled by adjusting screw 27-15. The contact and the change in height causes a deflection of rotor 1-15 against projections 2a-15 and therefore controls its movement. As a result, a pressing force between projection 2a-15 of stator 2-15 and rotor 1-15 can be controlled. Reliefs 2b-15 further define projections 2a-15 at their inner sides. Reliefs 2b-15 are used to prevent projections 2a-15 from making full contact with rotor 1-15. Consequently, even though rotor 1-15 is deflected, rotor 1-15 may make contact with stator 2-15 by means of outer diameter sides of the projections 2a-15.

Figure 29:
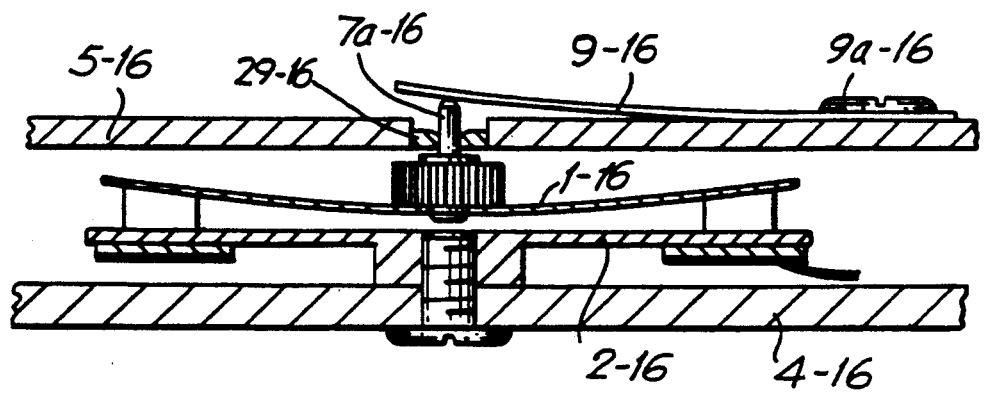
FIG. 29 is a cross-sectional view of an ultrasonic motor constructed in accordance with another embodiment of the invention.

FIG. 29 discloses another embodiment of an ultrasonic motor constructed in accordance with the invention. The ultrasonic motor of this embodiment replaces the pressing plate with a spring 9-16. In addition, a pressing or holding spring is provided for making a stable pressing force. Further, a hole stone 29-16 is provided for rotatably supporting a pivot 7a-16 with low friction.

Figure 30:
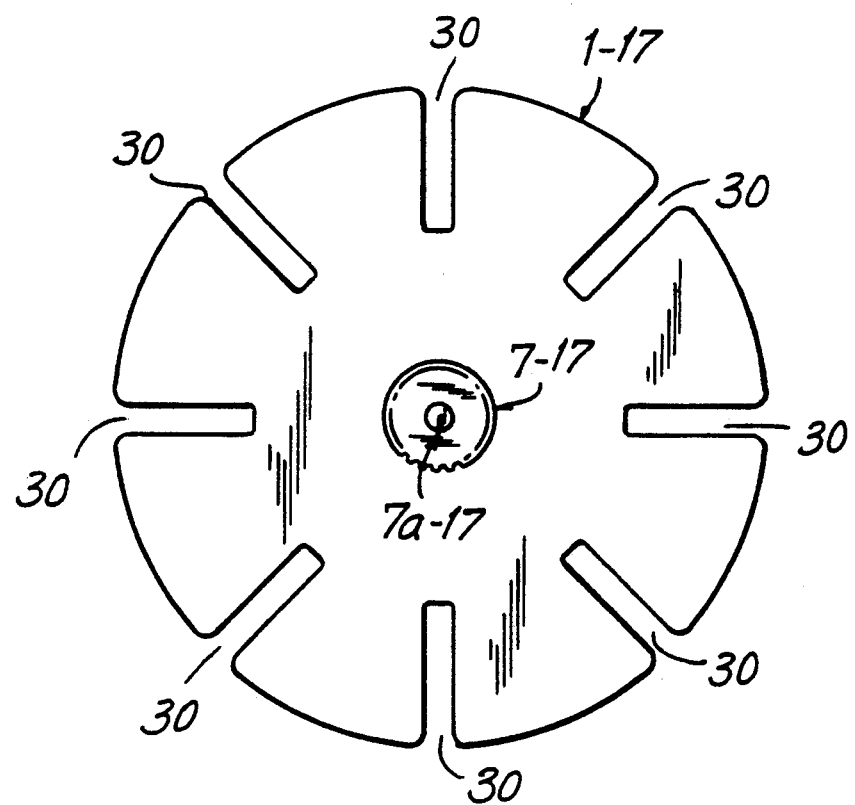
FIG. 30 is a plan view of a rotor of the ultrasonic motor depicted in FIG. 29.
Figure 31:
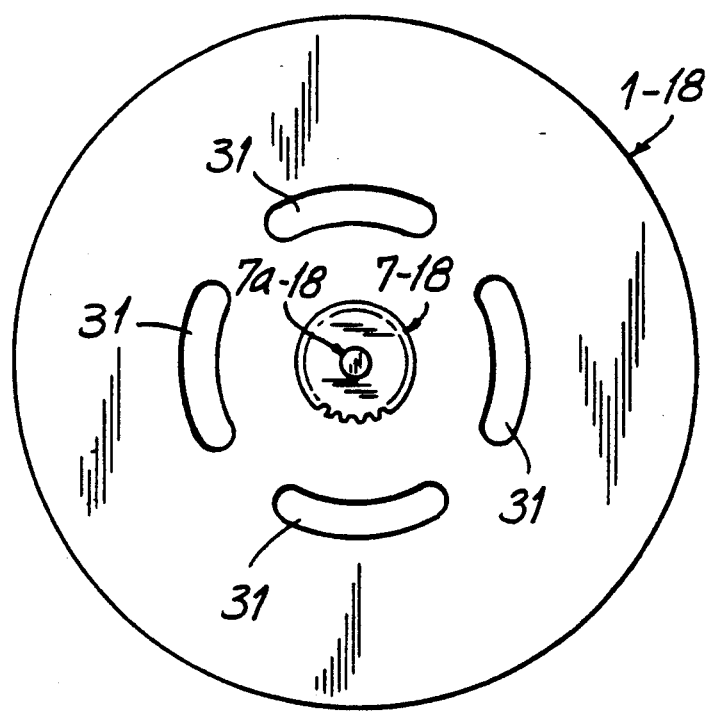
FIG. 31 is a plan view of a rotor of an ultrasonic motor constructed in accordance with another embodiment of the invention.

In another embodiment, FIG. 30 depicts a rotor 1-17 with a plurality of slits 30 for increasing flexibility of the rotor 1-17. In addition, rotor 1-17 includes a pinion 7-17 having a pivot 7a-17 used for adjusting the internal height of the ultrasonic motor. In still another embodiment, FIG. 31 discloses a rotor 1-18 of the ultrasonic motor having openings 31 surrounding a pinion 7-18 with a pivot 7a-18.

Accordingly, ultrasonic motors having flexible rotors have been set forth and described in detail. However, the shape of the rotor is not limited to the depicted spring portions, slits and openings. For example, the rotor may be formed from a simple disc as long as it has a flexible construction. It should be noted that in addition to using piezoelectric elements as sources of ultrasonic oscillation, magnetic strain elements and the like may be applied as the oscillation source. Further, in each embodiment a linear type motor may be used rather than the rotary type described above.

Figure 32:
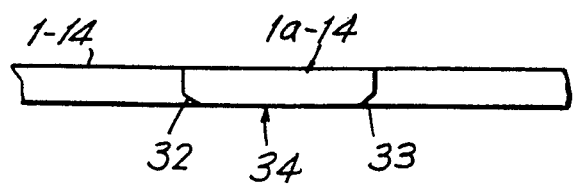
FIG. 32 is a partial side elevational view of a rotor constructed in accordance with the invention.
Figure 33:
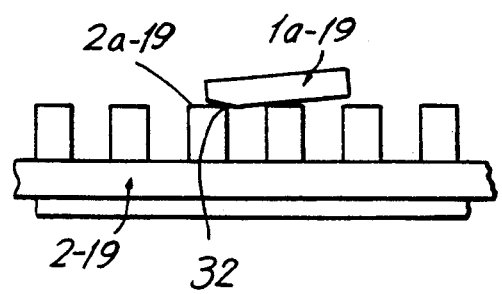
FIG. 33 and 34 are schematic diagrams of the operation of a stator and rotor of an ultrasonic motor construction in accordance with the invention.
Figure 34:
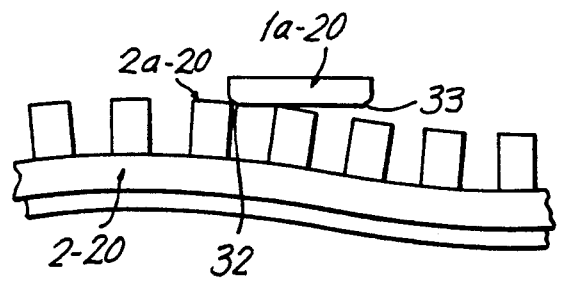

Reference is now made to FIGS. 32–34 in connection with a more detailed discussion of rotor 1-14. Rotor 1-14 is further provided with reliefs 32 and 33 formed at the corners of a sliding face 34 of projection 1a-14 of rotor 1-14. In this manner, sliding face 34 makes contact with projection 2a-14 of stator 2-14. Sliding faces 34 of projections 1b-14, 1c-14 and 1d-14 have a similar shape. As seen in FIGS. 33 and 34, although projection 1a-14 slants, relief 32 on projection 1a-14 makes contact with rotor 1-14 without any interference. In this manner, rotor 1-14 smoothly slides against stator 2-14.

When rotor 1-14 needs to move in only one direction or rotor 1-14 is prevented from moving in the reverse direction, it is sufficient to provide one relief 32 on sliding face 34 as shown in FIG. 33. Relief 32 may be formed by any method including machining, press rolling and bending. In another embodiment shown in FIG. 34, projection 1a-14 is provided with reliefs 32 and 33 at both ends of sliding face 34.

As set forth and detailed above, reliefs 32 or 33 prevent the corner of projections 1a-14 of rotor 1-14 and projections 2a-14 of stator 2-14 from interfering with one another but still allow them to make contact with one another. Accordingly, the shape and pattern of reliefs 32 and 33 are not limited to the above embodiments. In general, the number of projections formed on the rotor is less than the number of projections formed on the stator. In addition, the size of the projections on the rotor is large and therefore it is easy to construct, form and shape the projections.

Figure 35:
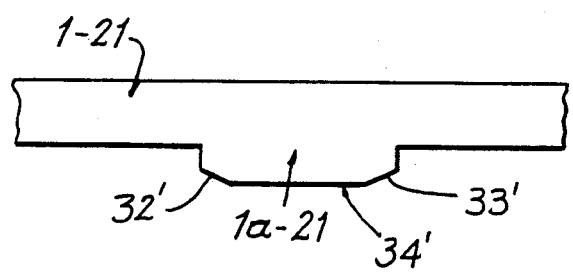
FIG. 35 is a partial side elevational view of a rotor in accordance with another embodiment of the invention.

Referring specifically to FIG. 35, another embodiment of a rotor projection is shown. Projection 1a-14, extending in direction of the thickness of rotor 1-14, is provided with reliefs 32', 33' and a sliding face 34'. By creating reliefs 32', 33' and a sliding face 34' a narrow or partial contact is made between rotor 1-14 and stator 2-14. Therefore, any shape or construction that provides for a narrow or partial contact obtains the desired results of the invention.

Figure 36:
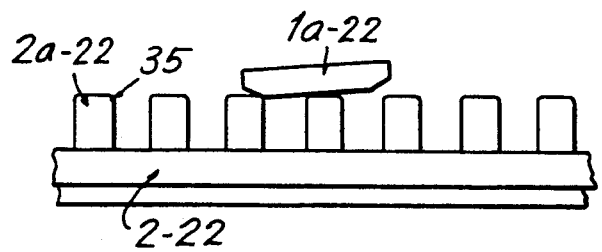
FIGS. 36 and 37 are schematic diagrams of the operation of the projections of the stator and rotor of an ultrasonic motor constructed in accordance with the invention.
Figure 37:
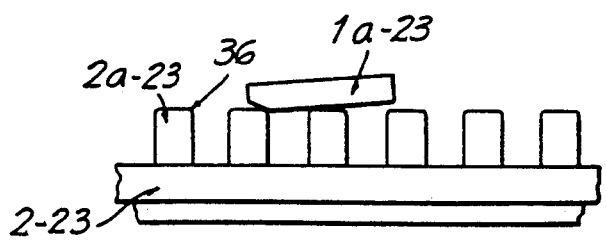

In FIG. 36, in addition to the relief portions provided on projection 1a-22 of rotor 1-22, projections 2a-22 of stator 2-22 are provided with a curved relief portion 35. In FIG. 37, projections 2a-23 are provided with relief portion 36. Accordingly, by providing both the rotor and stator with relief portions on their respective projections with a curved or slanted surface a more stable driving of the motor is attained.

Figure 38:
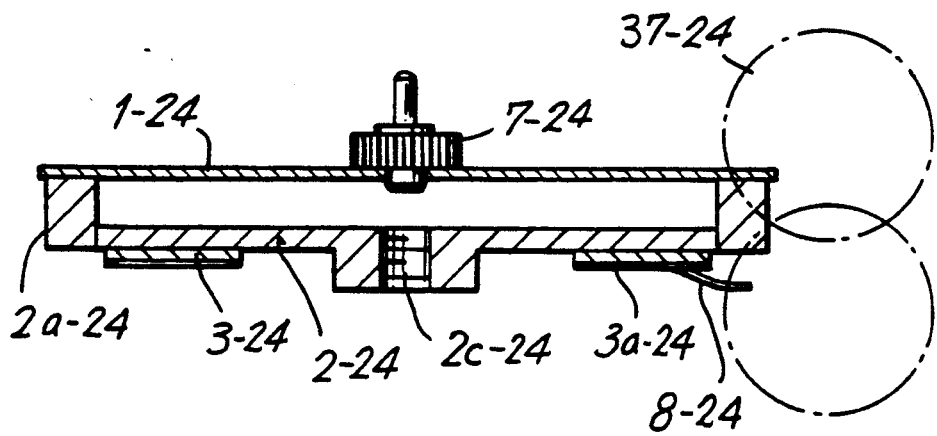
FIG. 38 is a cross-sectional view of the ultrasonic step motor constructed in accordance with the invention.
Figure 39:
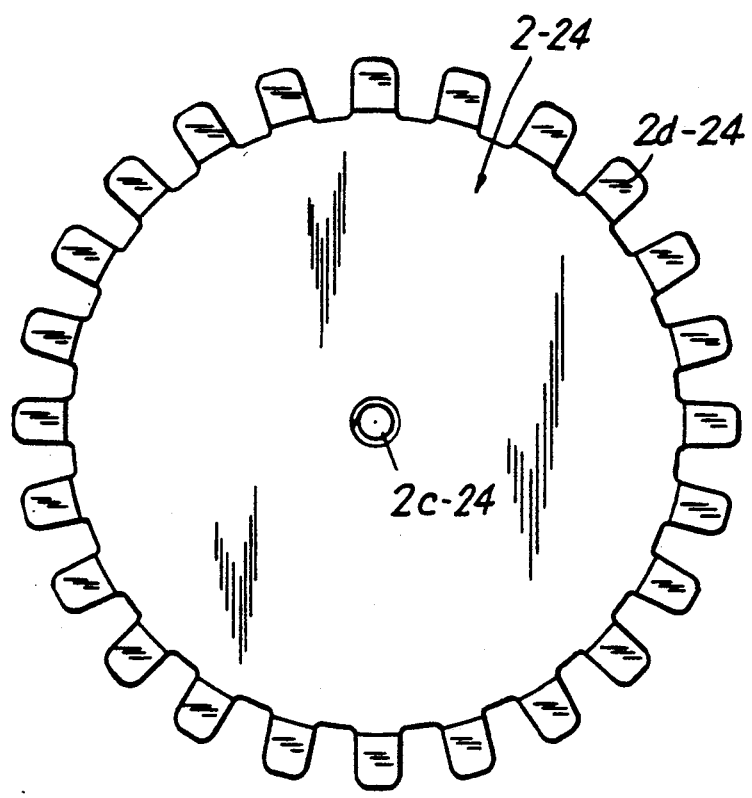
FIG. 39 is a top plan view of the stator shown in FIG. 38.

FIGS. 38 and 39 disclose yet another embodiment of an ultrasonic motor constructed in accordance with the invention. A threaded portion 2c-24 is provided for securing stator 2-24 at its center to a base. Projections 2a-24 and 2d-24 formed at the circumference of stator 2-24 radially extend from stator 2-24 away from the center and extend in the direction of thickness of stator 2-24. Projections 2a-24 and 2d-24 are formed by moving a tooth forming or generating cutter 37-24 shown by broken lines while simultaneously rotating stator 2-24. Thus, projections 2a-24 and 2d-24 are formed around the circumference of stator 2-24.

Figure 40:
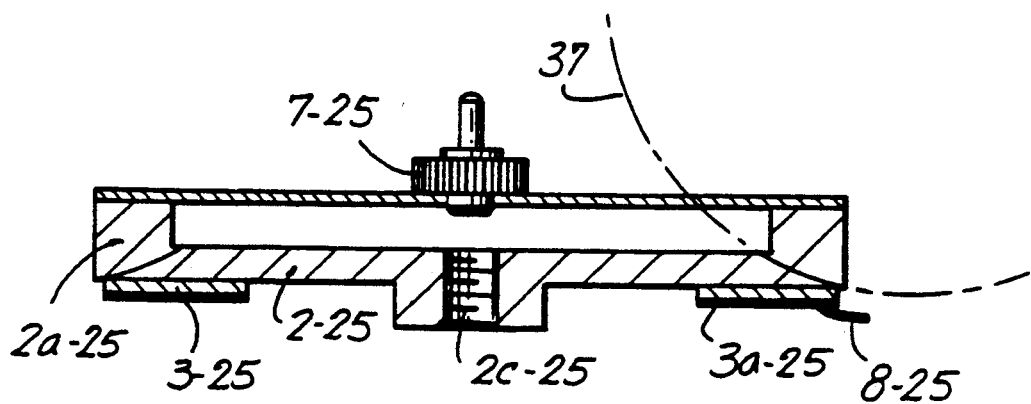
FIG. 40 is a cross-sectional view of an ultrasonic step motor constructed in accordance with another embodiment of the invention.
Figure 41:
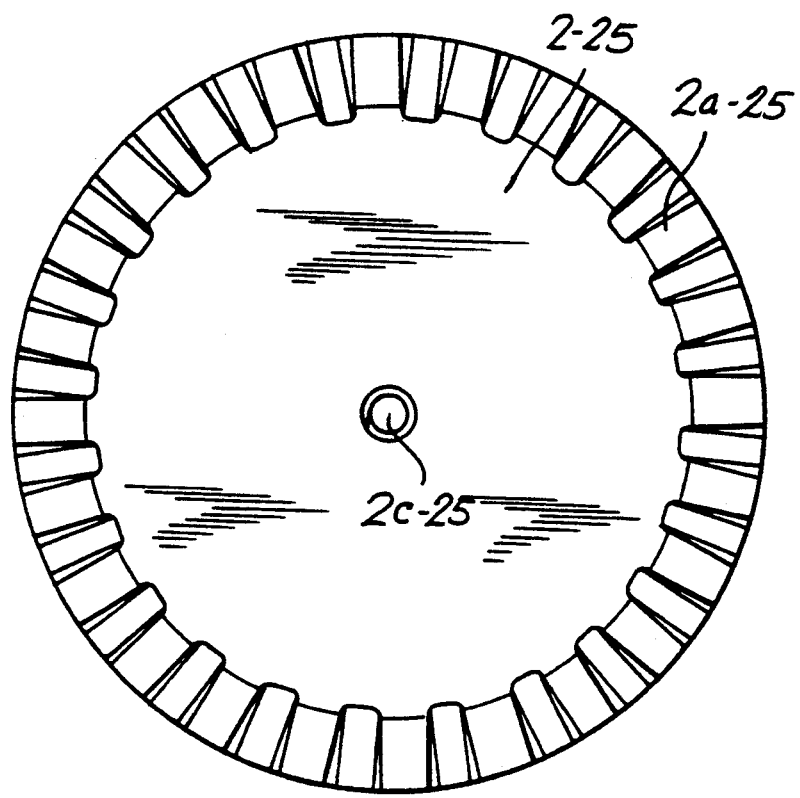
FIG. 41 is a top plan view of the stator shown in FIG. 40.

Reference is now made to FIGS. 40 and 41 showing another embodiment of a stator constructed in accordance with the invention. A stator 2-25 is formed by using tooth generating cutter 37-25. Tooth generating cutter 37-25 stops moving in the position shown by broken lines. As a result thereof, projections 2a-25 and 2d-25 are not formed in the radial direction, but rather the projections are thinned thereby decreasing their rigidity. Accordingly, the oscillation amplitude can be made large without difficulty due to the greater flexibility of stator 2-25.

Figure 42:
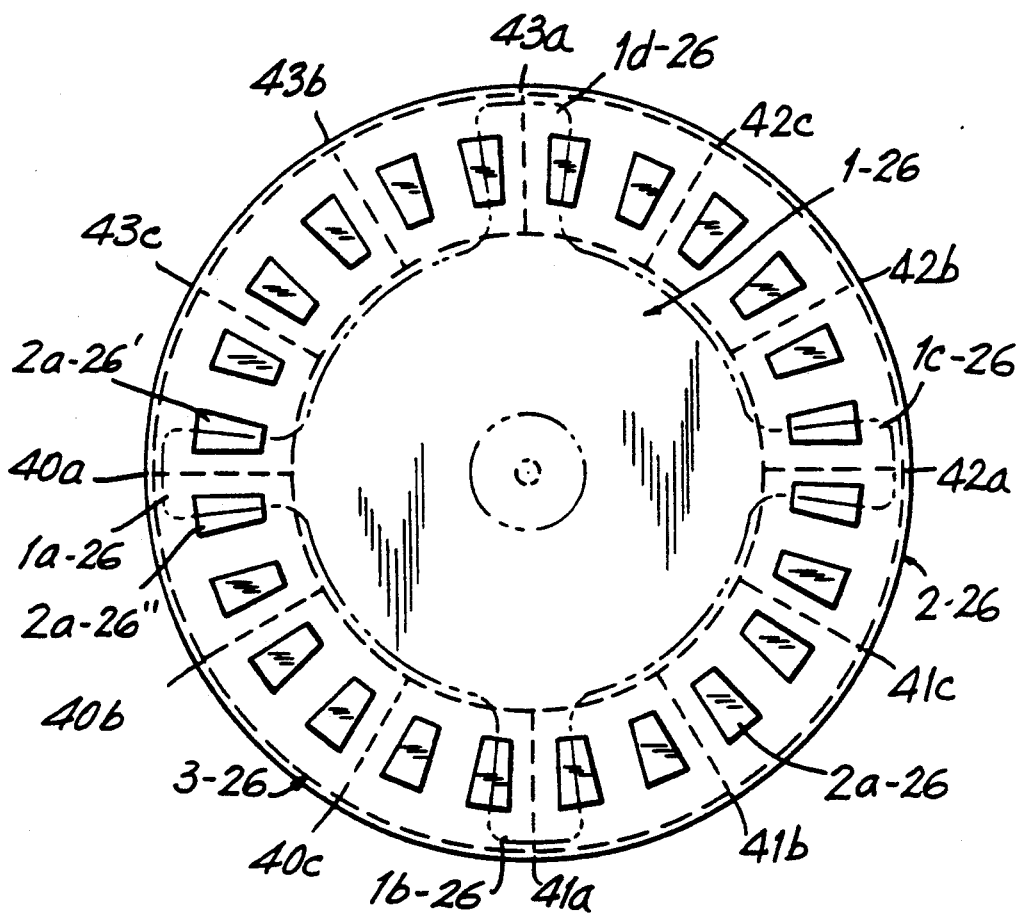
FIG. 42 is a top plan view of an ultrasonic step motor combining a rotor, piezoelectric element and electrode pattern.

FIG. 42 discloses a stator 2-26 of an ultrasonic step motor constructed in accordance with another embodiment of the invention. The chain double-dashed lines depict a rotor 1-26 and broken lines show the border of a piezoelectric element 3-26 and an electrode pattern 3a. A plurality of projections 2a-26 are provided to increase the oscillation amplitude in a circumferential direction of stator 2-26. In the present embodiment, twenty four (24) projections make contact with four projections 1a-26–1d-26 on rotor 1-26. In this manner, electrode pattern 3a-26 of piezoelectric element 3-26 is divided into twelve parts through twelve border lines of 40a–40c, 41a–41c, 42a–42c, and 43a–43c. Accordingly, projections 2a-26 do nor overlap with the border lines of the electrode pattern 3a-26, but rather the projections approach the border line of electrode pattern 3a-26.

Figure 43:
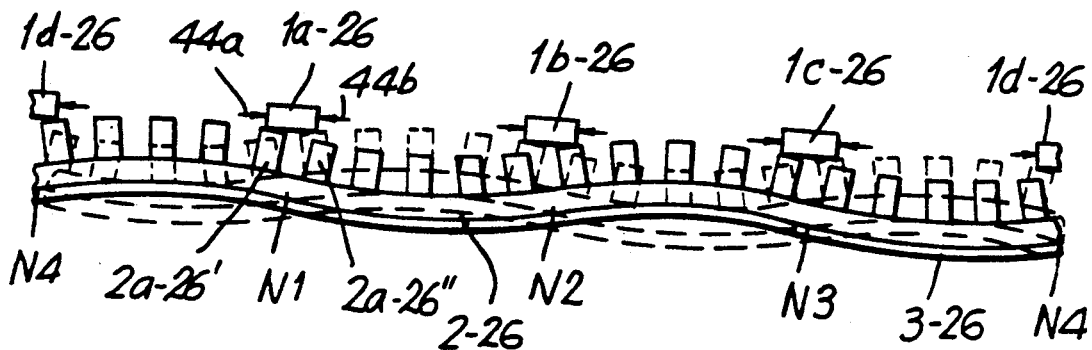
FIG. 43 is schematic diagram of the wave motion of the ultrasonic step motor of FIG. 42.
Figure 47:
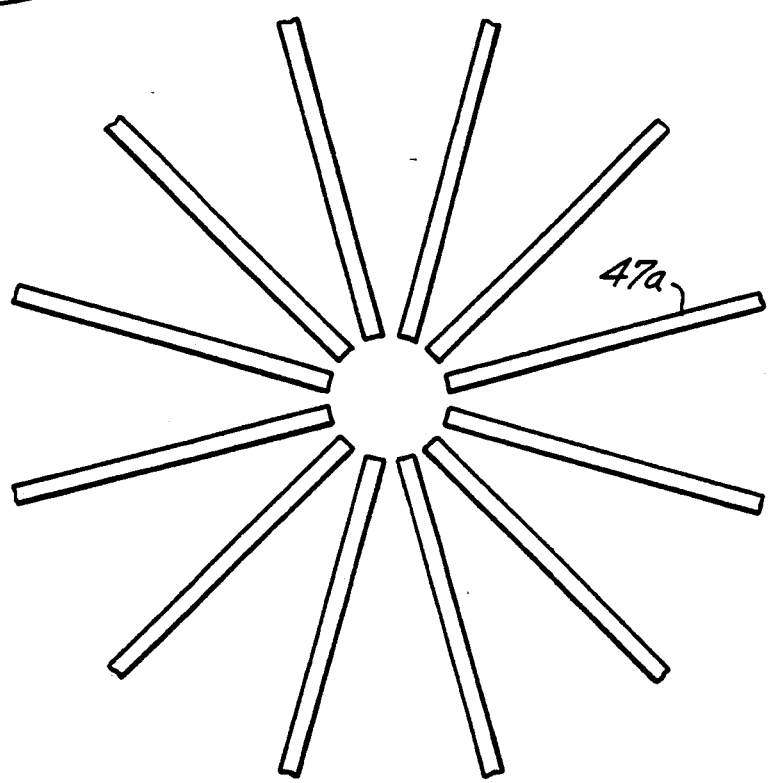
FIG. 47 is a top plan view of a wiring pattern for use with the piezoelectric element of FIG. 46.

Disc-shaped stator 2-26 is linearly represented as shown in FIG. 43 to set forth the method of operation of the ultrasonic motor shown in FIG. 47. Four projections 1a-26, 1b-26, 1c-26 and 1d-26 are formed on rotor 1-26 to make contact with projections 2a-26 forming four nodes N1, N2, N3 and N4. For purposes of explanation, stator 2-26 is described in a linear arrangement extending after projection 1d-26 and node N4. Stator 2-26 is further disclosed with broken and solid lines to show the reversed phases of oscillation of the stator 2-26.

In this construction, the inertia from rotor 1-26 causes projection 1a-26 to alternately receive driving forces 40 and 40b from the projections 2a-26' and 2a-26''. Then, rotor 1-26 stops when forces 40 and 40b become balanced. Accordingly, four projections 1a-26 through 1d-26 stop at positions related to nodes N1, N2, N3 and N4. When the positions of a projection and a node are shifted or misaligned, a driving force is effected in only one direction.

The displacement of projection 2a-26 is increased relative to the displacement of the piezoelectric element 3-26. According to the construction of the ultrasonic motor, electrode pattern 3a-26 is divided into twelve parts to form four groups of three parts each. In this configuration, four nodes are formed. When confronting groups are driven at the same phase and adjacent groups are driven at the opposite phase, the generated signal has an oscillation of 2λ. Projections 1a-26 through 1d-26 of rotor 1-26 are moved to the position of the neighboring nodes. FIGS. 42 and 43 show a condition of the motor in which borders 40a, 41a, 42a and 43a of electrode pattern 3a-20 are formed and respective projections 1a–1d are moved.

According to the embodiments of the ultrasonic motors set forth and described above, the motors are constructed with rotary type motors. However, the embodiments can be applied to a linear type ultrasonic step motor without limitation to the number of the nodes, number of the projections and the shape of the projections.

Figure 44:
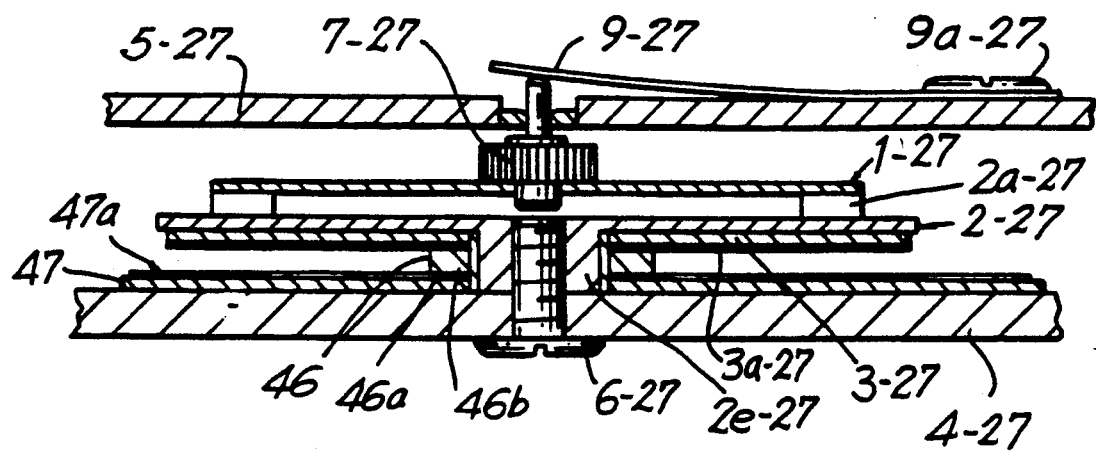
FIG. 44 is a cross-sectional view of an ultrasonic step motor constructed in accordance with another embodiment of the invention.

Reference is now made to FIG. 44 in which an ultrasonic motor according to still another embodiment constructed in accordance with the invention is provided. The difference between this embodiment and that of FIG. 29 being a wiring pattern formed on a circuit substrate 48 coupled to the piezoelectric unit through an anisotropic conductor.

A circuit substrate 47 is mounted on a base plate 4-27. A circuit pattern 47a is formed on circuit substrate 47 and coupled to an electrode pattern 3a-27 through an anisotropic conductor 46. Conductor 46 has a plurality of rod-shape conductor members 46a. Conductor 46 and conductor members 46a are formed with materials such as metal and carbon feelers. The ultrasonic motor further includes insulators 46b compressed by securing base plate 4-27 and stator 2-27 to each other with a holding screw 6-27 in order to press electrode pattern 3a-27, wiring pattern 47a, and conductor member 46a together with respect to one another. Insulators 46b are formed with rubber pieces and are separated from conductor 46 and conductor member 46a. A flange portion 2e-27 of stator 2-27 makes contact with base plate 4-27 to maintain a suitable compression value. Further, rotor 1-27 is pressed by a pressure spring 9-27 secured by a set screw 9a-27 through a pinion 7-27. This arrangement produces a frictional drive force to apply to rotor 1-27. The rotary force is transferred from rotor 1-27 through pinion 7-27.

Figure 45:
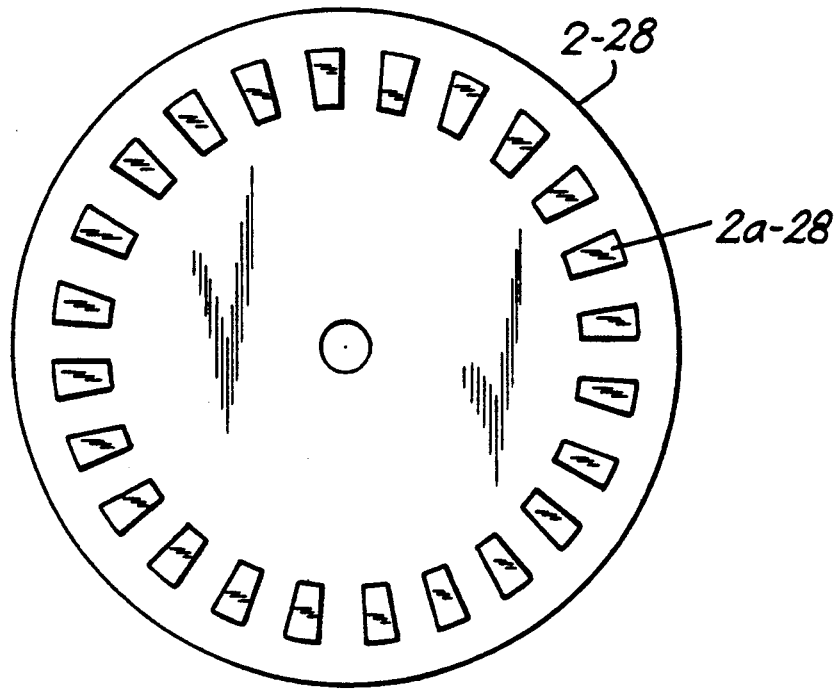
FIG. 45 is a top plan view of a stator of FIG. 44 constructed in accordance with another embodiment of the invention.
Figure 46:
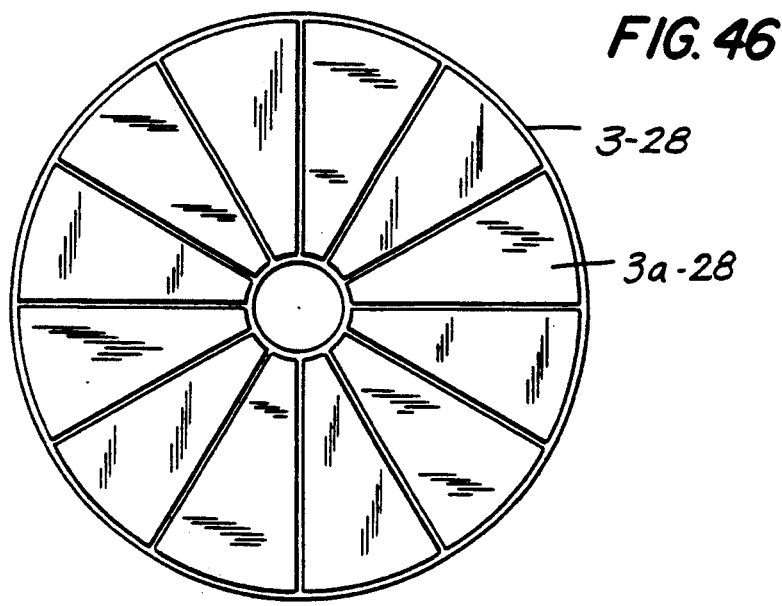
FIG. 46 is a bottom plan view of a piezoelectric element for use with the stator of FIG. 45.

Reference is made to FIG. 45 in which another embodiment of the invention having stator 2-28 provided with twenty four comb-like projections 2a-28 is depicted. FIG. 46 depicts yet another embodiment of the invention having a piezoelectric unit 3-28 and an electrode pattern 3a-28 divided into twelve pieces. FIG. 47 shows yet another embodiment of the invention having a wiring pattern 47a with twelve wiring patterns 14a extending radially.

Figure 48:
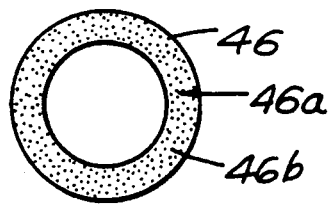
FIG. 48 is a top plan view depicting an anisotropic conductor for use with the wiring pattern of FIG. 47.
Figure 49:
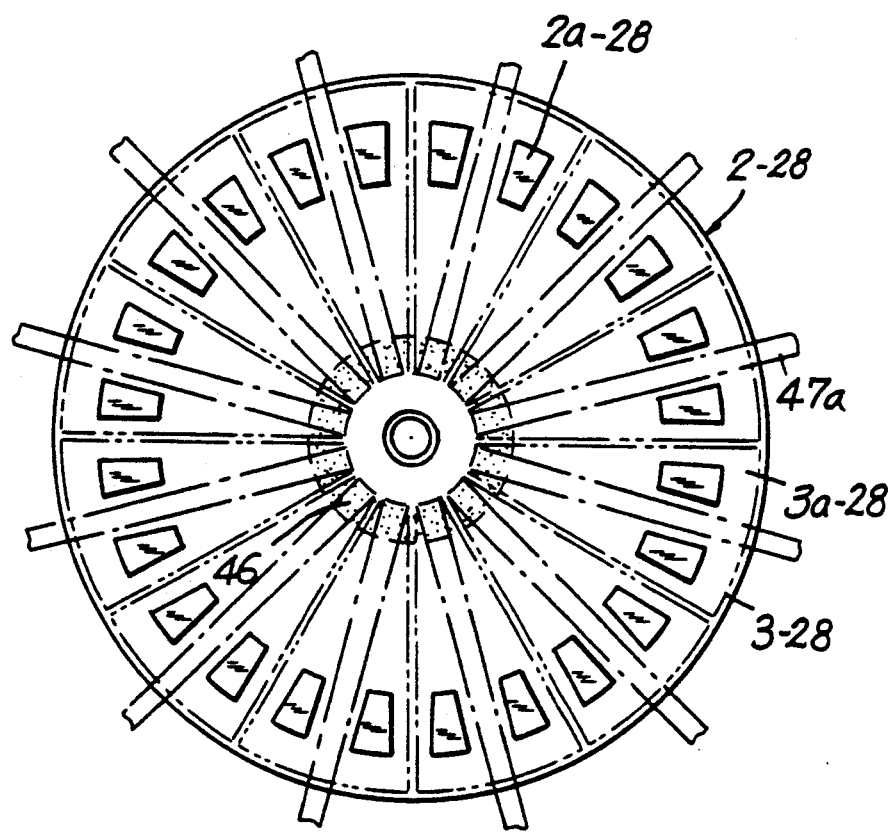
FIG. 49 is a top plan view of the composite of FIGS. 45-48 and the positional relation thereof.

Referring specifically to FIG. 48, an embodiment of the anisotropic conductor 46 is disclosed having a plurality of the conductor members 46a and plurality insulators 46b. Insulator 46b separates conductor members 46a from one another. FIG. 49 is a composite of FIGS. 45-48 piled one upon another in accordance with the invention. The composite of FIG. 49 includes stator 2-28, piezoelectric unit 3-28, electrode pattern 3a-28, circuit pattern 47a and anisotropic conductor 46, respectively.

Figure 50:
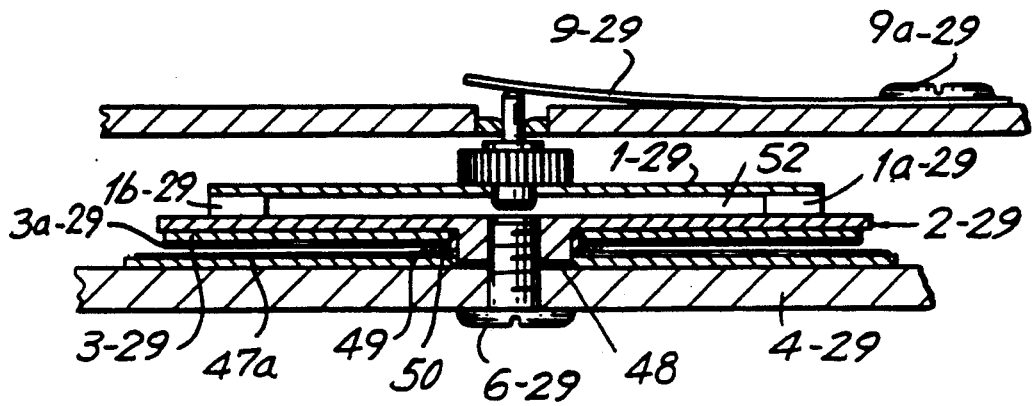
FIG. 50 is a cross-sectional view of an ultrasonic step motor constructed in accordance with another embodiment of the invention having grain-like conductor members contained in the anisotropic conductor.

FIG. 50 is a sectional view of an ultrasonic motor constructed in accordance with another embodiment of the invention. This embodiment is similar to that of FIG. 44, the primary differences being the substitution of rotor projections for stator projections and a grain-like conductor member 49 contained in the anisotropic conductor.

A gap 48 is located between base plate 4-29 and stator 2-29. Grain-like conductor member is disposed within the gap. A compression force generated by a set screw 6-29 acts upon grain-like conductor member 49. Circuit pattern 47a and electrode pattern 3a-29 are partially separated by an insulator 50 which presses electrode pattern 4a-29, wiring pattern 47a-29 and conductor member 49 together. Insulator 50 is preferably made from a thermal plastic resin and the like since it hardens and adheres at room temperature and advantageously separates at a high temperature.

The embodiments set forth and detailed above comprise twelve electrode patterns and twelve wiring patterns. According to the characteristic of the invention, a plurality of electrode patterns and wiring patterns are simultaneously made conductive without limitation on the number of the patterns. Anisotropic conductor is formed from any conductive material having an insulative thickness in a horizontal direction. Accordingly, any anisotropic material can be used when it has such characters. In addition, the anisotropic conductor is placed at the center of the stator in the embodiments detailed above. However, any positions may be used as long as the wiring pattern and the electrode pattern face one another.

Figure 51:
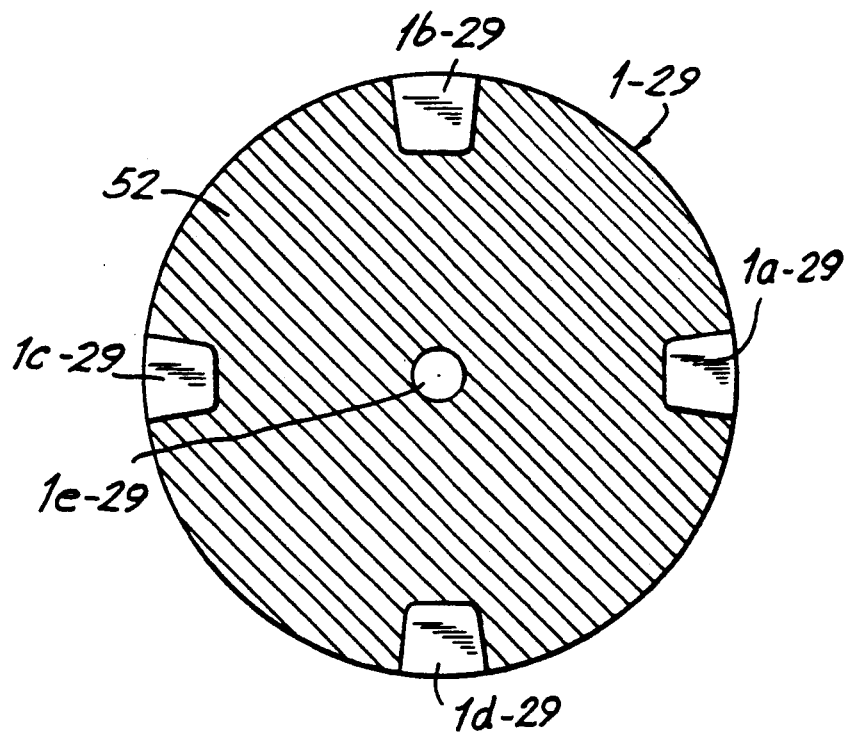
FIG. 51 is a bottom plan view of the rotor shown in FIG. 50.

The ultrasonic motor described in FIG. 50 also includes rotor 1-29 shown in FIG. 51 which is driven stepwise by movements of standing waves. Hatched portions of rotor 1-29 depict relief portion 52 formed by an etching process. Non-hatched portions are projections 1a-29 through 1d-29 also formed by an etching process. A central hole 1e is formed within pinion rotor 1-29 for joining pinion 7-29 to couple the ultrasonic motor together.

In this embodiment, piezoelectric unit 3-29 of the ultrasonic motor is chemically manufactured by at least one of the following methods, spraying, CVD process or dipping. Piezoelectric unit 3-29 may be physically manufactured by evaporation or spattering, or by a mechanical process of compressing, shaping and baking a piezoelectric material containing a binder. When piezoelectric unit 3-29 is physically manufactured by spattering, a membrane-type piezoelectric material grows to obtain a monocrystalized material; thereby obtaining a piezoelectric unit 3-29 having an excellent character. In addition, piezoelectric unit 3-29 may be manufactured by thermally compressing or adhering piezoelectric material directly to stator 2-29.

Figure 52:
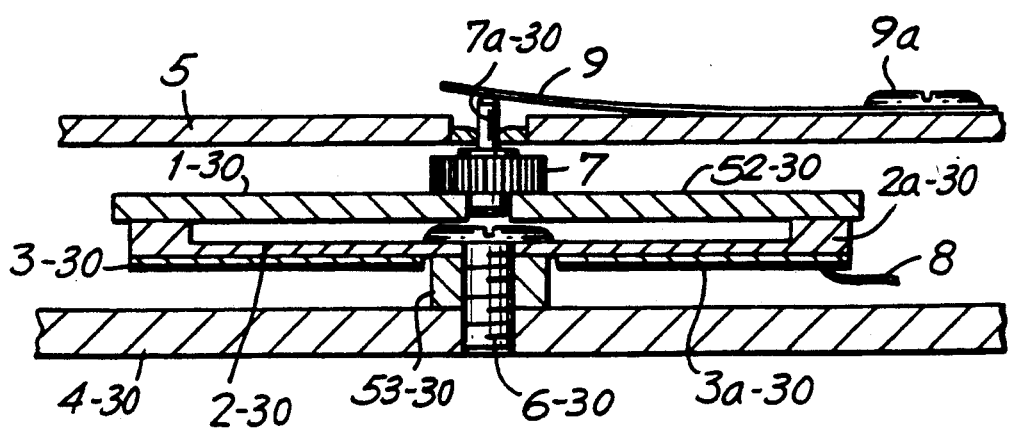
FIG. 52 is a cross-sectional view of an ultrasonic step motor constructed in accordance with another embodiment of the invention.
Figure 53:
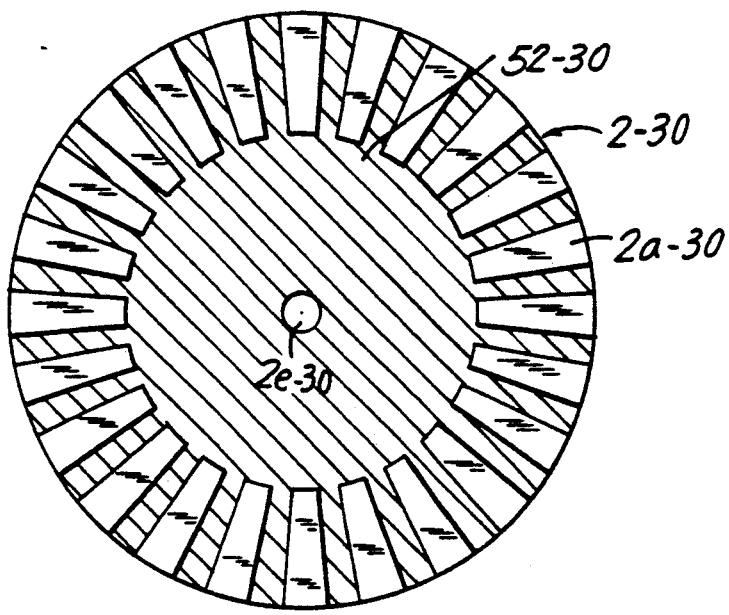
FIG. 53 is a top plan view of the stator shown in FIG. 52.

Referring specifically to FIGS. 52 and 53, an ultrasonic motor constructed in accordance with another embodiment of the invention having a stator 2-30 is disclosed. Hatched portions depict relief portions 52, while non-hatched portions depict projections 2a-30 of stator 2-30. A hole is formed within stator 2-30 at a central portion 2e-30 having a set screw 6-30 extending therethrough. Stator 2-30 is secured to base plate 4-30 by set screw 6-30 through a spacer 53-30. Relief portion 52-30 is formed by an etching process and the piezoelectric element 3-30 is formed by any process set forth in the description of stator 2-29. In this construction, the ultrasonic motor generates surface waves to continuously rotate as described in Japanese Patent Laid-Open Application No. 61-102177.

Figure 54:
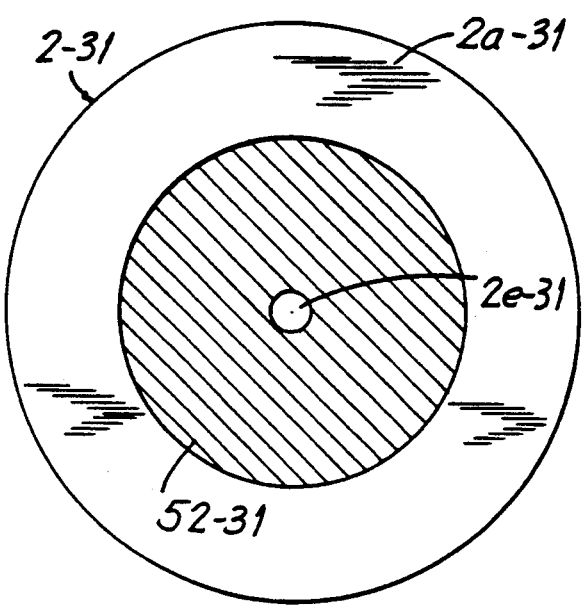
FIG. 54 is a top plan views of a stator constructed in accordance with another embodiment of the invention.
Figure 55:
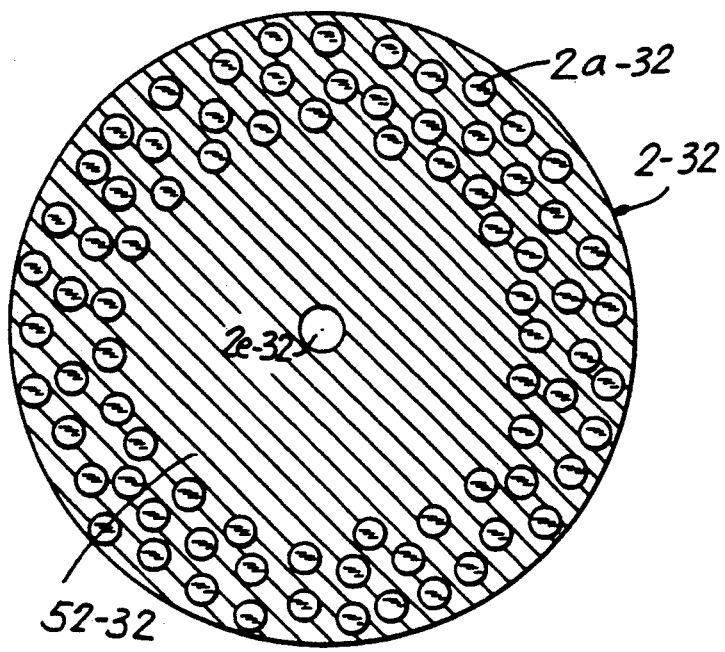
FIG. 55 is a top plan view of a rotor constructed in accordance with another embodiment of the invention.

Reference is made to FIGS. 54 and 55, in which stators constructed in accordance with another embodiment of the invention are shown. Since relief portions 52-31 and 52-32 and projections 2a-31 and 2a-32 of stators 2-31 and 2-32 are formed by an etching process, their shape may therefore be formed in any manner or configuration. Accordingly, as long as projections 2a-31 and 2a-32 enlarge the oscillation displacement of stators 2-31 and 2-32 and make at least a partial contact with a rotor, any configuration will attain the goals of the invention.

Figure 56:
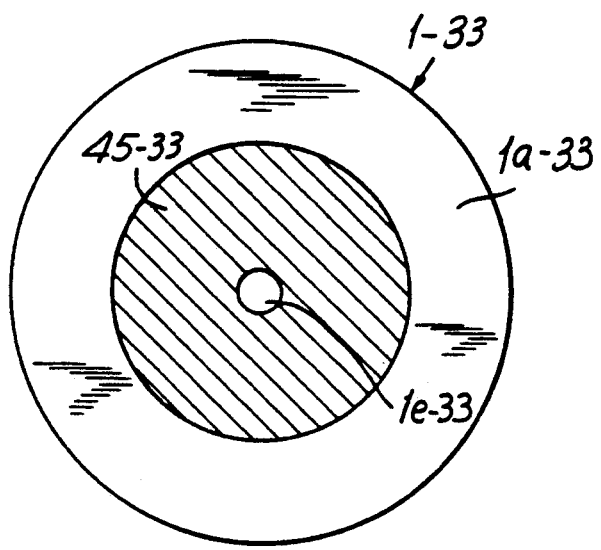
FIG. 56 is a bottom plan view of a rotor constructed in accordance with another embodiment of the invention.

Additionally, FIG. 56 depicts a rotor 1-33 for an ultrasonic motor constructed in accordance with another embodiment of the invention. Rotor 1-33 is constructed to generate surface waves and continuously rotate. Rotor 1-33 is constructed having relief portion 45-33 and a projection 1a-33. This configuration allows rotor 1-33 to make contact with a stator at its peripheral portion resulting in the production of a high torque.

Figure 57:
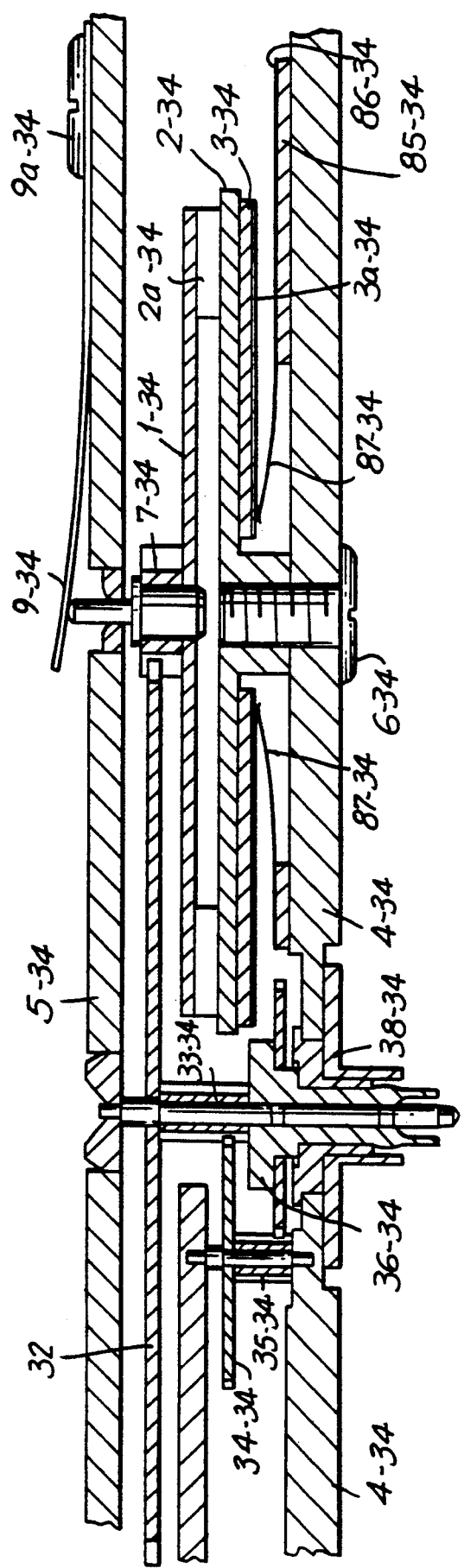
FIG. 57 is a cross-sectional view of an ultrasonic step motor constructed in accordance with another object of disclosing an electric conduction structure.

Reference is now made to FIG. 57, in which a sectional view of an ultrasonic step motor constructed in accordance with the invention is provided. Like numerals are utilized to indicate like structure, the difference between this embodiment and that described above being the use of overhanging circuitry for providing electric contact with piezoelectric vibrators 3-2.

A circuit substrate 85-34 is mounted on base plate 4-34. A circuit pattern 86-34 is formed on circuit board 85-34 with overhang portions 87-34 extending beyond circuit board 85-34 to overlap piezoelectric unit 3-34. Overhang portions 87-34 are resiliently pressed against electrode patterns 3a-34 of piezoelectric unit 3-34 so that AC voltages from the circuit (not shown) are applied to the electrode patterns 3a-34. Thus, stator 2-34 is caused to vibrate in the flexure mode of vibration and rotor 1-34 is rotated by the circumferential vibration force components at the projections 2a-34. This turning force drives pinion 7-34 of rotor 1-34 which in turn drives fourth wheel 32-34 engaged with the seconds hand. The turning force also drives, through the third wheel 33-34, center pinion 36-34 which is engaged with the minute hand. Then, after the rotary speed has been decelerated further, cannon pinion 38-34 engaged with the hour hand is driven.

Figure 58:
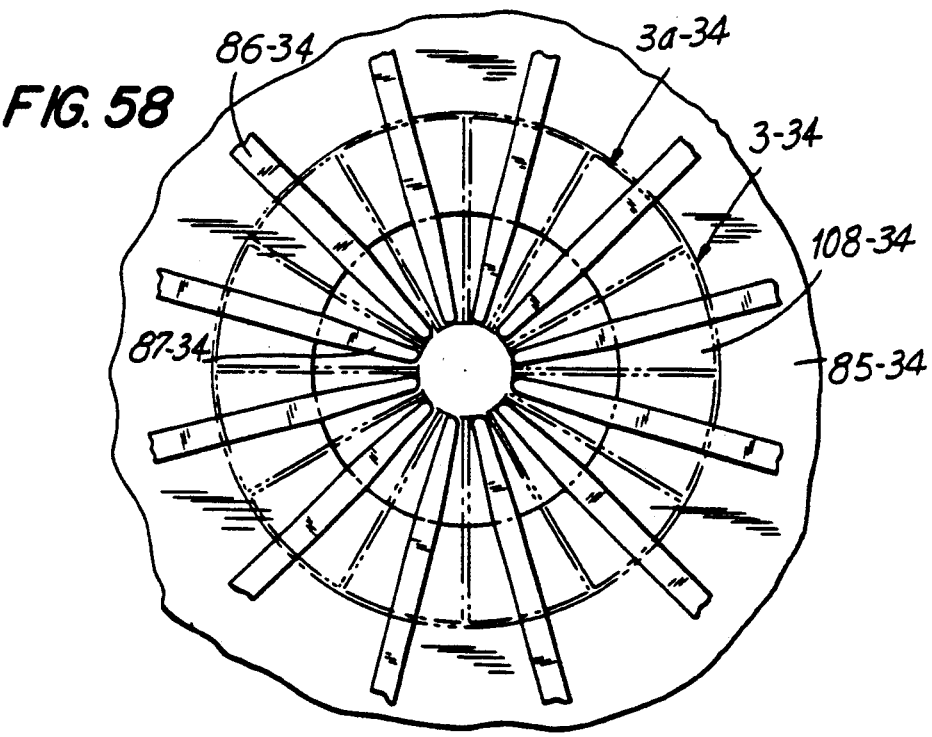
FIG. 58 is bottom plan view of the relationship between the circuit patterns, the overhang portions and the vibrators of FIG. 57.

Reference is now made to FIG. 58 in which a plan view showing the relationship between the circuit patterns, the overhang portions and the vibrators is provided. The dotted lines show the positional relation between piezoelectric unit 3-34 and the electrode patterns 3a-34. The piezoelectric unit 3-34 is divided into a plurality of vibrators 108-34 (twelve vibrators in this embodiment) and each of the vibrators 108-34 has a separate electrode pattern. Therefore, there are as many circuit patterns 86-34 arranged on circuit board 85-34 as there are electrode patterns. As a result, vibrators 108-34 can be driven independently of each other. Of course, the number layout, form, etc., of the electrode patterns 3a-34 and the circuit patterns 86-34 are not limited to the present embodiment.

With the construction described above, if stator 2-34 is mounted with the overhang portions 87-34 being turned up and the stator 2-34 is fixed in place by fastening screw 6-34, the conduction between the electrode patterns 3a-34 and the circuit patterns 86-34 is easily established during assembly by the spring force of overhang portions 87-34. Even if there are any variations in the height of the turned-up overhang portions 87-34, overhang portions 87-34 are easily deflected thus preventing any detrimental effects such as the occurrence of distortions in stator 2-34.

Figure 59:
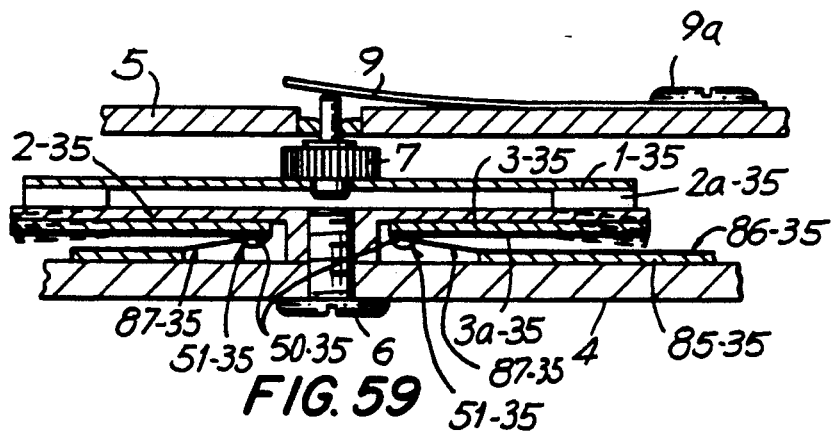
FIG. 59 is a sectional view of an ultrasonic motor constructed in accordance with another embodiment of the invention depicting the electric conducting structure.

Reference is now made to FIG. 59 in which a sectional view showing an ultrasonic motor constructed in accordance with another embodiment of the electric conducting structure of the ultrasonic step motor is provided. Like numerals are utilized to indicate like structures disclosed above. The difference in this embodiment being the use of a conductive material 51-35 attached to each distal end 50-35 of overhang portions 87-35. Distal end 50-35 is where overhang portions 87-35 of circuit patterns 86-35 are brought into contact with respective electrode patterns 3a-35. This results in enhanced conducting reliability. Also, on the external edges of stator 2-35, where the vibration amplitude is large, rotor 1-35 is in contact with the projections 2a-35 and both are adapted to operate even with increases in the circumferential vibration amplitude. The broken lines show the deflected conditions of the stator 2-35. However, contacting distal ends 50 are provided at positions on piezoelectric unit 3-35 where the vibration amplitudes are small as seen in FIG. 59. While this is also true of other embodiments, in this construction the electric contact with circuit patterns 86-35 is not affected by the vibrations.

Figure 60:
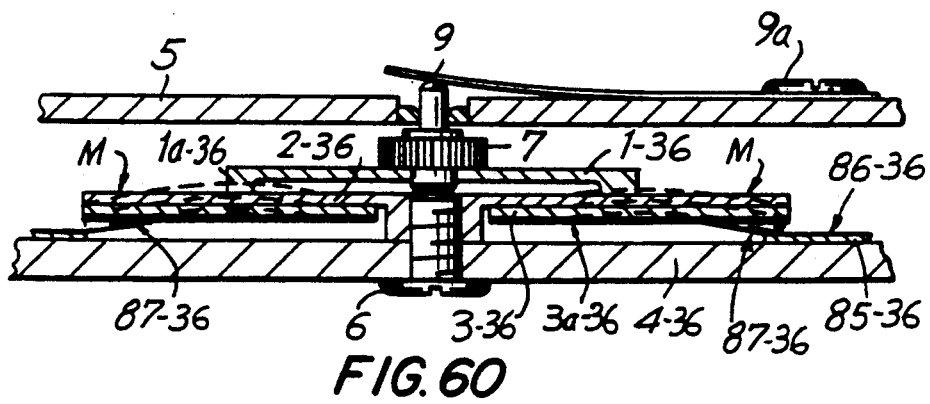
FIG. 60 is a sectional view of an ultrasonic motor constructed in accordance with another embodiment of the invention depicting the electric conducting structure.

Reference is now made to FIG. 60 in which a sectional diagram showing an ultrasonic motor constructed in accordance with still another embodiment of the invention in which the electric conduction structure of the ultrasonic step motor is provided. Like numbers are utilized to indicate like structures. This embodiment differs from the previous embodiment in that stator 2-36 is in contact with projections 1a-36 formed on the lower surface of the disk-type rotor 1-36. The broken lines show examples of the displaced condition during vibrations and the illustrated case shows the vibration mode with nodal circles M. Portions of the nodal circles M do not vibrate and therefore the overhang portions 87-36 of the circuit patterns 86-36 are in contact with the electrode patterns at 3a-36 of the piezoelectric unit 3-36 at nodal circles M. Also, rotor 1-36 and the stator 2-36 are in contact at the portions of the vibration anti-nodes. In this embodiment, even if the overhang portions 87-36 are strongly forced into contact with piezoelectric unit 3-36, there is no effect on the vibrations and thus the conduction reliability is enhanced.

Figure 61:
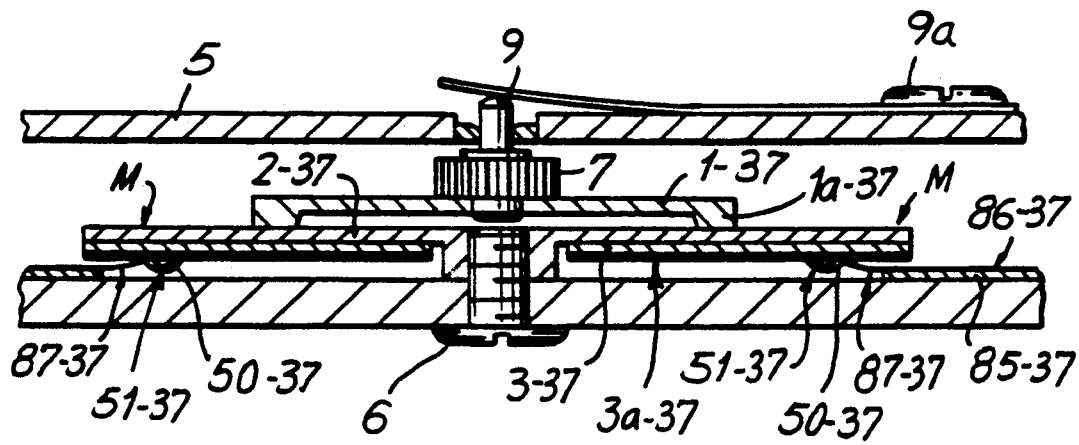
FIG. 61 is a sectional view of an ultrasonic motor constructed in accordance with another embodiment of the invention depicting the electric conducting structure.

Reference is now made to FIG. 61 in which a sectional view showing an ultrasonic motor constructed in accordance with still another embodiment of the electronic conduction structure is provided. Again, like numerals are utilized to illustrate like structures. This embodiment differs from the previous embodiment in that the conducting reliability is further improved by attaching a conductive agent 51-37, e.g., conductive adhesive or solder to each of distal ends 50-37 of overhang portion 87-37. Even in this embodiment, due to the attachment of conductive agent 51-37 to overhang portions 87-37 at the vibration nodal circles M of stator 2-37, the mass of the conductive agent 51-37 has no effect on the vibrations.

Figure 62:
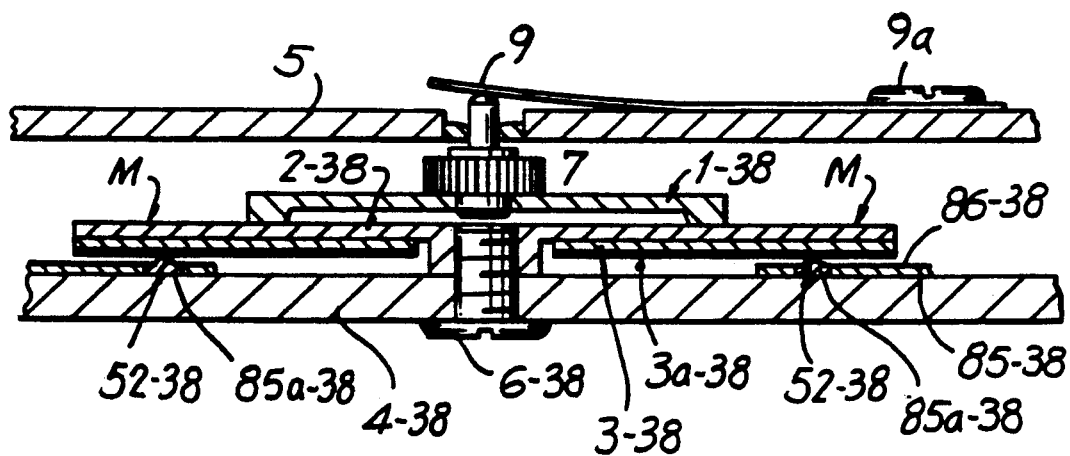
FIG. 62 is a sectional view of an ultrasonic motor constructed in accordance with another embodiment of the invention depicting the electric conducting structure.

Reference is now made to FIG. 62 in which a sectional view showing an ultrasonic motor constructed in accordance with still another embodiment of the electric conducting structure is provided. Like numerals are utilized to indicate like structure. This embodiment utilizes the same vibration mode as FIGS. 60 and 61. The difference being the replacement of overhang portions 87-38 with projections 52-38.

Rotor 1-38 and stator 2-38 are brought into contact with each other at the vibration anti-nodes. Projections 52-38 are disposed within circuit patterns 86-38 of circuit board 85-38. Each projection 52-38 is formed at one of holes 85a-38 provided in circuit board 85-38. With this construction, by fastening stator 2-38 in place with the fastening screw 6, projections 52-38 are sandwiched by base plate 4-38 and electrode patterns 3a-38 thereby ensuring conducting. The contacting of stator 2-38 with rotor 1-38 at the anti-nodes further insures that projections 52-38 are in contact with electrode pattern 39-38. In this case, any variations in the height of projections 52-38 are tolerated by the plastic deformation and elastic deformation of the projections 52-38.

Figure 63:
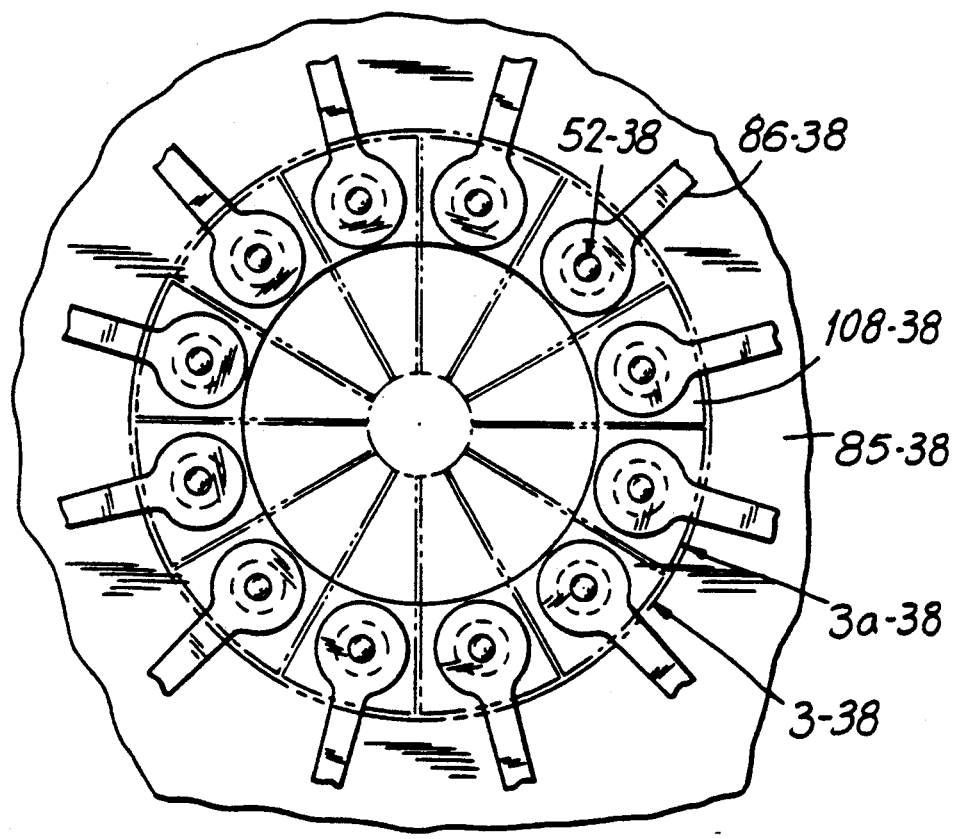
FIG. 63 is a bottom plan view showing the relation among the circuit patterns, the overhang portions and vibrators of FIG. 62.

Reference is now made to FIG. 63, a plan view showing the relation among the circuit patterns, the projections and the vibrators of FIG. 62. The positions of circuit pattern 86-38 and the projections 52-38 which are formed on the circuit board 85-38 correspond to electrode patterns 3a-38 of piezoelectric unit 3-38 which are indicated by the broken lines. While the number of vibrators 108-38 in this embodiment is twelve as shown in FIG. 58, the present invention is not limited to this embodiment.

Figure 64:
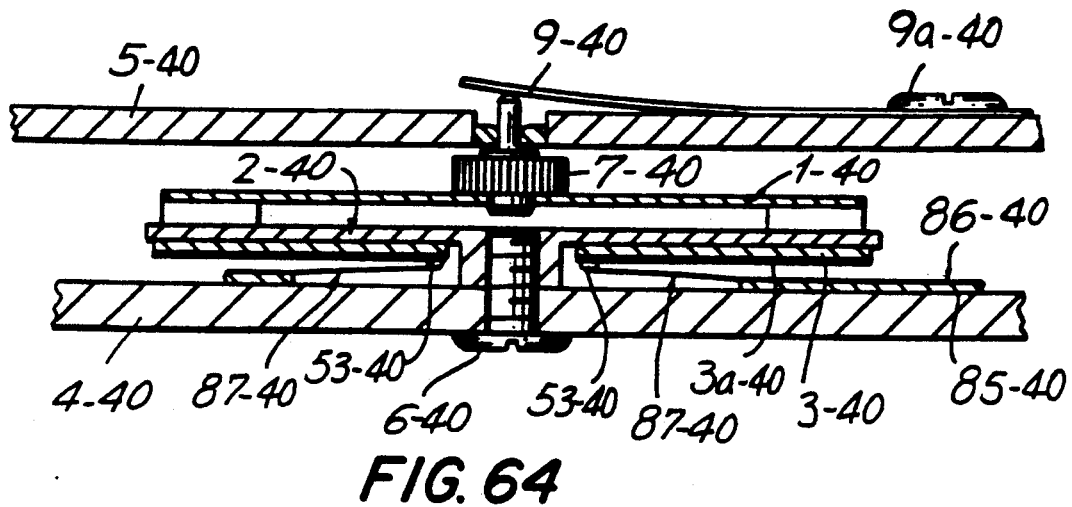
FIG. 64 is a cross-sectional view of an ultrasonic step motor constructed in accordance with another embodiment of the invention having an electric conduction structure.

Reference is now made to FIG. 64, in which a sectional view showing an ultrasonic motor constructed in accordance with still another embodiment of the electric conducting structure is provided. Like numerals are used to indicate like structure. This embodiment utilizes the same vibration mode as FIG. 59 as well as the same stator 2-40. The difference between the embodiments of FIG. 64 and FIG. 59 the use of bumps in overhang portion 87-40.

Overhang portion 87-40 extends to the center of stator 2-40. Bumps 53-40 are provided at the distal ends of respective overhang portions 87-40. Since the vibration amplitude of the stator 2-40 is low in the central portion, a current is supplied through bumps 53-40, and the overhang portion 87-40 of the circuit patterns 86-40 formed on the circuit board 85-40, to the inner diameter side of electrode patterns 3a-40 of piezoelectric unit 3-40. In an exemplary embodiment bumps 53-40 may be made of solder, gold, conductive adhesive or the like and the electrode patterns 3a-40 and the overhang portions 87-40 are fastened together to effect the electric conducting. As a result, bumps 53-40 are held to electrode patterns 3a-40 and variations in the height direction are accommodated by the elastic deformation and plastic deformation of overhang portions 87-40. This construction has a high degree of freedom for position setting in the height direction and the electric conducting is positively ensured.

It is to be noted that with the electric conducting structure of the ultrasonic step motor constructed in accordance with the invention, the only requirement for the structure is that electrode patterns 3a-40 and circuit patterns 87-40 are elastically brought into contact so as to provide electric conduction therebetween and the invention is not limited to the above-mentioned embodiments. Also, the modes of vibration are not limited to the previously mentioned embodiments.

As described above the relief portions of the stator or the rotor are formed by an etching process. In addition, the piezoelectric element can be formed directly on the stator. Accordingly, the shape and function of the relief portions and the projections are not limited to the various embodiment mentioned above of the ultrasonic motor according to the invention. Any materials including metals and silicone can be used to make the rotor and the stator as long as they can be formed by either an etching process or other micro-machining techniques.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A motor comprising:
a first member having portions selectively displaceable in a first direction; a second member movable in a second direction substantially orthogonal to said first direction; and drive control means for selectively displacing said first member portions so that said first member portions selectively contact said second member causing said second member to move in said second direction;
each of said first and second members being formed with a surface facing the surface of the other member, said facing surfaces being shaped to cause the movement of the second member when selectively contacted by the surface of the first member; and
at least one of said surfaces being an essentially flat sliding face so that the first member and the second member slide smoothly against one another, said sliding face having at least one leading edge in the direction of displacement of said sliding face, the leading edges of the sliding face having curved relief portions so that contact is made between the first and second members without interference.

2. The motor of claim 1, wherein each of said first and second members is formed with a surface facing the surface of the other member, said facing surfaces being shaped to cause the movement of the second member when selectively contacted by the surface of the first member.

3. The motor of claim 1, wherein said second member rotates so that said second direction is substantially circular.

4. The motor of claim 1, wherein said first member portions vibrate.

5. The motor of claim 1, wherein said vibrations of said first member portions form a standing wave in said first member.

6. The motor of claim 1, wherein said motor is an ultrasonic motor.

7. The motor of claim 1, wherein the relief portions are formed by an etching process.

8. A motor comprising:
a first member having portions selectively displaceable in a first direction; a second member movable in a second direction substantially orthogonal to said first direction; and drive control means for selectively displacing said first member portions so that said first member portions selectively contact said second member causing said second member to move in said second direction;
each of said first and second members being formed with a surface facing the surface of the other member, said facing surfaces being shaped to cause the movement of the second member when selectively contacted by the surface of the first member;
at least one of said surfaces being an essentially flat sliding face so that the first member and the second member slide smoothly against one another, said sliding face having at least one leading edge in the direction of displacement of said sliding face; the leading edges of the sliding face being formed as slanted relief portions.

9. The motor of claim 8, wherein the relief portions are formed by an etching process.

10. A motor comprising:
a first member having portions selectively displaceable in a first direction; a second member movable in a second direction substantially orthogonal to said first direction; and drive control means for selectively displacing said first member portions so that said first member portions selectively contact said second member causing said second member to move in said second direction;
each of said first and second members being formed with a surface facing the surface of the other member, said facing surfaces being shaped to cause the movement of the second member when selectively contacted by the surface of the first member;
a plurality of first member projections formed on said first member and adapted to make contact with the surface of the second member;
the first member projections include said displaceable portions being formed with ends, said ends being formed with rounded relief portions contacting with the surface of the second member.

11. The motor of claim 10, wherein the relief portions are formed by an etching process.

12. A motor comprising:
a first member having portions selectively displaceable in a first direction; a second member movable in a second direction substantially orthogonal to said first direction; and drive control means for selectively displacing said first member portions so that said first member portions selectively contact said second member causing said second member to move in said second direction;
each of said first and second members being formed with a surface facing the surface of the other member, said facing surfaces being shaped to cause the movement of the second member when selectively contacted by the surface of the first member;
a plurality of first member projections formed on said first member and adapted to make contact with the surface of the second member;
the plurality of first member projections being formed on the circumference of the first member extending in a radial direction from the center of the first member;
the plurality of first member projections being formed so that the projections are thinned in the radial direction, thereby decreasing the rigidity of the first member and increasing the oscillation amplitude.

13. The motor of claim 10, wherein the displaceable portions are disposed at positions about said first member different from locations which become vibration nodes of the first member.

14. The motor of claim 13, wherein the displaceable portions of the first member are positioned opposing the vibration nodes.

15. A motor comprising:
a first member having portions selectively displaceable in a first direction; a second member movable in a second direction substantially orthogonal to said first direction; and drive control means for selectively displacing said first member portions so that said first member portions selectively contact said second member causing said second member to move in said second direction;
a first member having portions selectively displaceable in a first direction; a second member movable in a second direction substantially orthogonal to said first direction; and drive control means for selectively displacing said first member portions so that said first member portions selectively contact said second member causing said second member to move in said second direction;
said first member including a stator having said displaceable portions;
said second member including a rotor, said rotor having a plurality of radial projections, said projections being selectively contacted by said stator;
a plurality of vibrator means, at least one of said vibrator means being operably coupled to one of said displaceable stator portions for displacing said stator portions; and
said drive control means exciting each of said plurality of vibrator means to form a standing wave in said displaceable portions of said stator, and phase shifting said standing wave to move said rotor in a stepwise manner.

16. The motor of claim 15, wherein said vibrator means is a vibrator including a plurality of vibrating elements.

17. The motor of claim 16, wherein said vibrators are formed from a piezoelectric material directly attached to the second member.

18. The motor of claim 15, said drive control means causing a relative phase change of said standing waves applied to said vibrator means to form said standing wave on said stator.

19. The motor of claim 15, said drive control means selectively turning said standing waves applied to said vibrator means from an ON state to an OFF state to form said standing wave on said stator.

20. The motor of claim 15, further comprising drive control means for inducing a vibration mode in said vibrator having a standing wave of one wave length $\lambda$, wherein $\lambda$ defines one wavelength in a vibrating condition, by shifting a position of a node of the vibration mode on said stator by increments of $l$ causing said rotor to move in a direction so that $l$ is less than $\lambda/4$ relative to the wave length in a moving direction of the first member.

21. The motor of claim 15, wherein said stator is substantially round and nodes are formed about said stator when oscillated, further comprising drive control means for displacing the positions of nodes of said stator vibrating at a vibration mode of standing waves shifted by increments of $\theta$ degrees about said stator so said rotor rotates by increments of $\theta$ degrees when $\theta$ degrees being less than $90°/N$ wherein N is the number of node diameters.

22. The motor of claim 15, further including a second drive control means for exciting the vibrator means so as to form an advancing wave on said stator to continuously drive the rotor, and a switching means for switching between the first-mentioned and the second drive control means.

23. A motor comprising:
a first member having portions selectively displaceable in a first direction; a second member movable in a second direction substantially orthogonal to said first direction; and drive control means for selectively displacing said first member portions so that said first member portions selectively contact said second member causing said second member to move in said second direction;
wherein said first member includes a stator having said displaceable portions;
said second member including a rotor, said rotor having a plurality of radial projections, said projections being selectively contacted by said stator;
a plurality of vibrator means, at least one of said vibrator means being operably coupled to one of said displaceable stator portions for displacing said stator portions; and
second drive control means exciting said vibrator means so as to form an advancing wave in said stator to continuously drive the rotor.

24. The motor of claim 15, wherein the second member is formed of a flexible material.

25. The motor of claim 15, wherein said second member is formed with slits formed therein.

26. The motor of claim 15, wherein said second member is formed with openings therein.

27. The motor of claim 15, wherein said second member includes spring portions.

28. The motor of claim 15, further comprising a circuit board, a circuit pattern mounted on said circuit board for coupling said drive control means to each of said plurality of vibrator means, each of said plurality of vibrator means including an electrode, said circuit pattern being formed of an elastically deformable material, said circuit pattern being elastically pressed against an electrode of each respective vibrator means.

29. The motor of claim 28, wherein said circuit board is formed with a hole therein, said circuit pattern including a plurality of overhanging portions extending into said opening, said electrodes being disposed above said opening in facing relation with a respective one of said plurality of overhang portions.

30. The motor of claim 29, wherein said overhang portion includes a distal end extending into said opening, said overhang portion being formed in a turned up curve so that said distal end extends towards said electrode to come in contact therewith.

31. The motor of claim 30, further comprising a drop of conductive material formed at said distal end of each of said plurality of overhang portions.

32. The motor of claim 31, wherein said plurality of vibrator is formed in substantially a circle and said distal ends of said plurality of overhang portions extend to an inner diameter of said plurality of vibrator means.

33. The motor of claim 32, wherein said conductive material is an adhesive for securing said distal end of said overhang portion to a respective electrode.

34. The motor of claim 33, wherein said circuit board is formed with a plurality of projections thereon said projections extending toward a respective electrode, a portion of said circuit pattern being formed on said projection to come in contact with a respective electrode to provide a conductive pathway therebetween.

35. The motor of claim 34, wherein excitation of said plurality of vibrating means causes vibrational nodes to be formed on said plurality of vibrator means, said overhang portions contacting said plurality of vibrator means at said vibrational nodes.

36. A motor comprising:
a first member having portions selectively displaceable in a first direction; a second member movable in a second direction substantially orthogonal to said first direction; and drive control means for selectively displacing said first member portions so that said first member portions selectively contact said second member causing said second member to move in said second direction;
each of said first and second members being formed with a surface facing the surface of the other member, said facing surfaces being shaped to cause the movement of the second member when selectively contacted by the surface of the first member; and
a plurality of first member projections which include said displaceable portions being formed on said first member and adapted to make contact with the surface of the second member;
wherein the plurality of displaceable portions are disposed at positions about said first member different from and opposed to locations which become vibration nodes of the first member.

37. A motor comprising:
a first member having portions selectively displaceable in a first direction; a second member formed with a periphery and openings therethrough at locations therein spaced from the periphery, said second member being movable at least at said periphery in a second direction substantially orthogonal to said first direction; and drive control means for selectively displacing said first member portions so that said first member portions selectively contact said second member causing said second member to move in said second direction; and
each of said first and second members being formed with a surface facing the surface of the other member, said facing surfaces being shaped to cause the movement of the second member when selectively contacted by the surface of the first member.

38. The motor and claim 37, wherein the second member has a central region for rotational mounting, said openings including a plurality of spaced, essentially circumferentially extending openings positioned intermediate the central region and the periphery.

39. A motor comprising;
a first member having portions selectively displaceable in a first direction; a second member having spring portions movable in a second direction substantially orthogonal to said first direction; and drive control means for selectively displacing said first member portions so that said first member portions selectively contact said second member causing said second member to move in said second direction; and
each of said first and second members being formed with a surface facing the surface of the other member, said facing surfaces being shaped to cause the movement of the second member when selectively contacted by the surface of the first member.

40. The motor of claim 39, wherein the spring portions are formed with spaced circumferential openings.

41. The motor of claim 39, wherein the second member includes a periphery and a central region for rotational mounting, the spring portions being defined by spaced, essentially circumferentially radially extending slits positioned intermediate the central region and the periphery.

42. A motor comprising:
a first member having portions selectively displaceable in a first direction; a second member movable in a second direction substantially orthogonal to said first direction; and drive control means for selectively displacing said first member portions so that said first member portions selectively contact said second member causing said second member to move in said second direction;
a base plate;
said second member being disposed between the first member and said base plate;
a piezoelectric element coupled to the second member;
a plurality of electrode patterns formed on the piezoelectric element;
at least one wiring pattern formed on said base plate in a facing relationship with said plurality of electrode patterns formed on the piezoelectric element; and
an anisotropic conductor including a carbon wire and a metal wire fixed to one another by an insulator in a conductive direction connecting the plurality of the electrode patterns to at least one wiring pattern.

* * * * *